United States Patent [19]

Barber

[11] Patent Number: 4,513,376
[45] Date of Patent: Apr. 23, 1985

[54] PHASOR PROCESSING OF INDUCTION LOGS INCLUDING SKIN EFFECT CORRECTION

[75] Inventor: Thomas D. Barber, Houston, Tex.

[73] Assignee: Schlumberger Technology Corporation, Houston, Tex.

[21] Appl. No.: 339,006

[22] Filed: Jan. 12, 1982

[51] Int. Cl.³ .......................... G01V 3/18; G01V 3/38
[52] U.S. Cl. .................... 364/422; 324/339
[58] Field of Search ............... 364/422; 324/323, 339; 367/38, 43

[56] References Cited

U.S. PATENT DOCUMENTS

| | | | |
|---|---|---|---|
| 2,582,314 | 1/1952 | Doll | 324/339 |
| 2,790,138 | 4/1957 | Poupon | 324/339 |
| 3,056,917 | 10/1962 | Tanguy | 324/339 X |
| 3,067,383 | 12/1962 | Tanguy | 324/339 |
| 3,147,429 | 9/1964 | Moran | 324/339 |
| 3,166,709 | 1/1965 | Doll | 324/339 |
| 3,179,879 | 4/1965 | Tanguy | 324/339 |
| 3,226,633 | 12/1965 | Schneider | 324/339 |
| 3,340,464 | 9/1967 | Gouilloud | 324/339 |
| 3,750,009 | 7/1973 | Baker | 324/323 |
| 4,314,339 | 2/1982 | Kenyon | 364/422 X |

OTHER PUBLICATIONS

D. S. Parasnis, *Principles of Applied Geophysics*, John Wiley & Sons, New York, 1979, 212–219.
C. F. George, Jr., et al., "Application of Inverse Filters to Induction Log Analysis", *Geophysics*, vol. XXXI, No. 1, Feb. 1964, 93–104.
S. Gianzero, et al., "A New Look at the Skin Effect", SPWLA Twenty-Second Annual Logging Symposium, Jun. 23–26, 1981, 1–36.
J. H. Moran, et al., "Basic Theory of Induction Logging and Application to Study of Two-Coil Sondes", *Geophysics*, vol. 27, No. 6, Part I, Dec. 1962, 829–858.
H. G. Doll, "Introduction to Induction Logging and Application to Logging of Wells Drilled with Oil Base Mud", *Journal of Petroleum Technology*, Jun. 1949.
J. F. Kaiser, et al., "On the Use of the Io–Sinh Window for Spectrum Analysis", *IEEE Transactions on Acoustics, Speech and Signal Processing*, vol. ASSP-28, No. 1, Feb. 1980, 105–107.

*Primary Examiner*—Jerry Smith
*Assistant Examiner*—Clark A. Jablon

[57] ABSTRACT

A method and system for processing induction measurements of sub-surface formations taken by an induction logging system at various depths in a borehole is disclosed. The method reduces the effects of variations in the sonde response function with formation conductivity (skin effect). A filtering function is applied to the quadrature-phase X component measurement of each log measurement to obtain a correction component measurement representative of the change in the sonde response function as a function of formation conductivity. The correction component measurements are then summed with the in-phase R components to obtain a skin effect compensated log.

14 Claims, 17 Drawing Figures

IDEAL LOWPASS FILTER RESPONSE

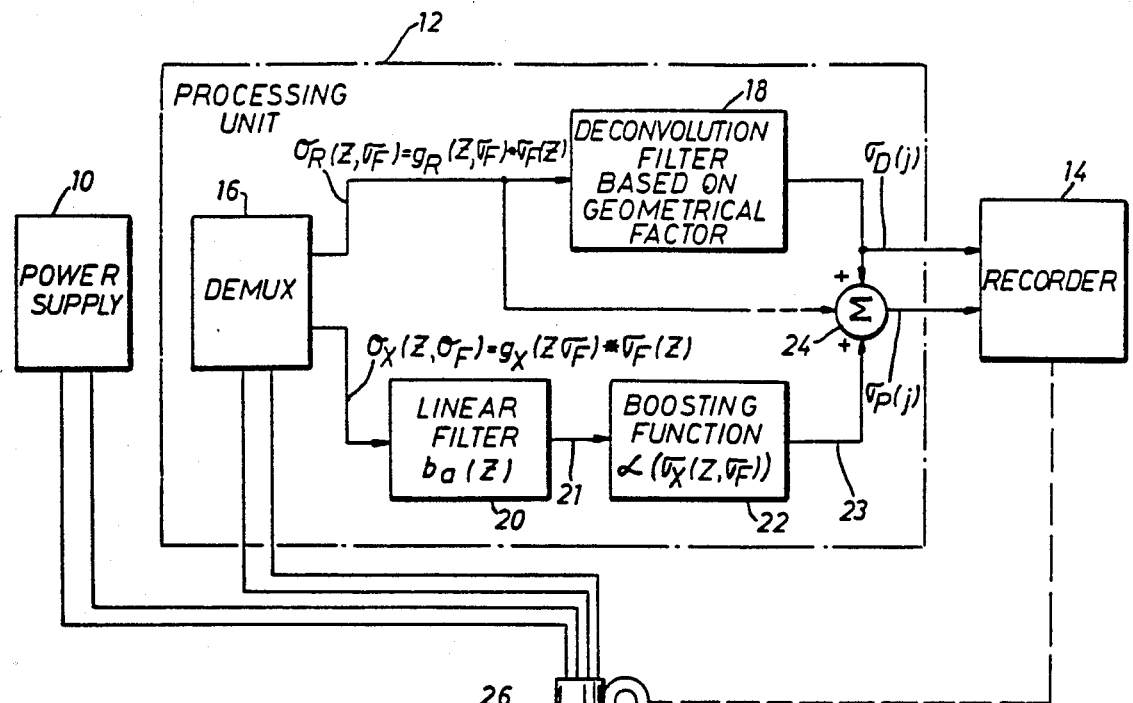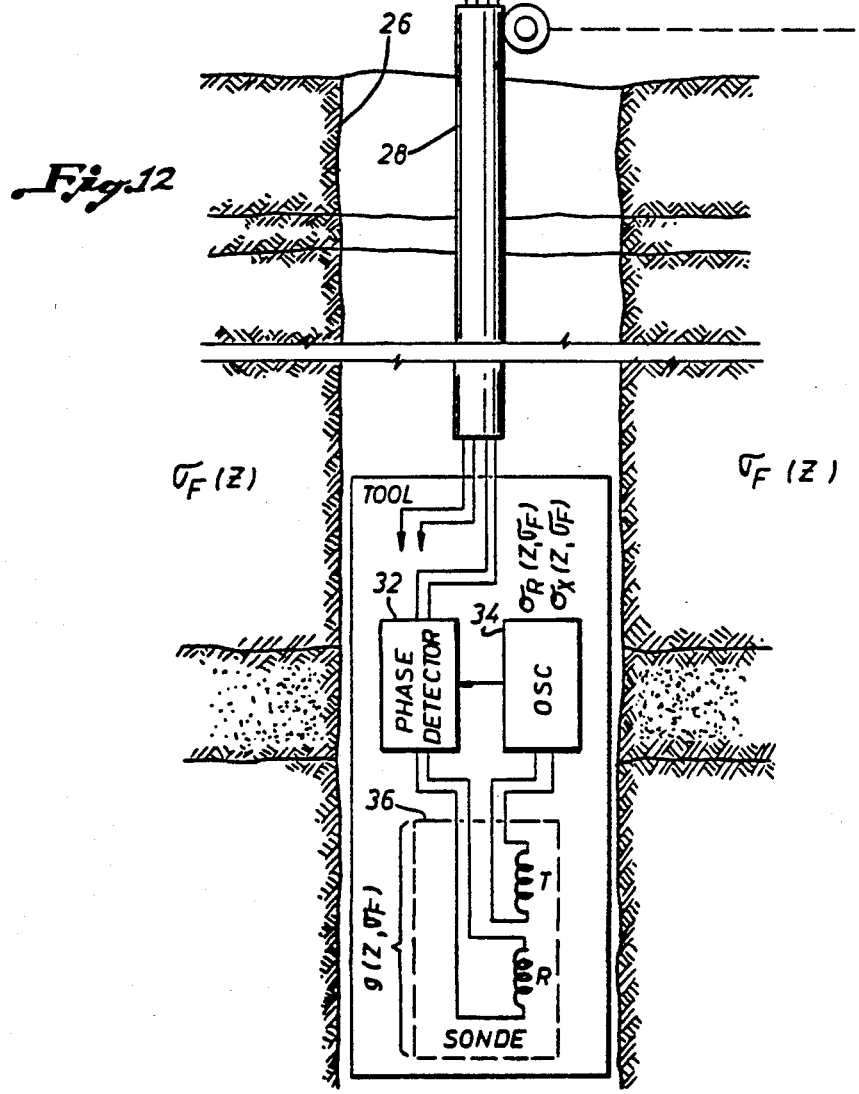
Fig. 12

PHASOR RESPONSE CURVES COMPARED WITH PRIOR ART RESPONSE FOR INDUCTION SONDE AS IT TRAVERSES THE THIN BED.

PHASOR PROCESSING OF INDUCTION LOGS INCLUDING SKIN EFFECT CORRECTION

CROSS-REFERENCE TO RELATED APPLICATIONS

This application relates to the following applications which are filed concurrently herewith: U.S. patent application Ser. No. 338,951, now U.S. Pat. No. 4,467,425 and entitled "Deconvolution Filter For Induction Log Processing," and U.S. patent application Ser. No. 339,005, now U.S. Pat. No. 4,471,436 and entitled "Phasor Processing of Induction Logs Including Shoulder and Skin Effect Correction." Each of the related applications are assigned to the same Assignee as the present application.

BACKGROUND OF THE INVENTION

This invention relates to electrical induction logging systems for determining the nature and characteristics of the various sub-surface formations penetrated by a borehole in the earth. More particularly, this invention relates to a method and system for processing the induction log measurements whereby the non-linear variations in the sonde response function as a function of the conductivity of the formations being investigated and the unwanted contributions to each log measurement from currents flowing in formations spaced apart from the measurement depth are attenuated.

It is important to the oil and gas industry to know the nature and characteristics of the various sub-surface formations penetrated by a borehole because the mere creation of a borehole (typically by drilling) usually does not provide sufficient information concerning the existence, depth location, quantity, etc., of oil and gas trapped in the formations. Various electrical techniques have been employed in the past to determine this information about the formations. One such technique commonly used is induction logging. Induction logging measures the resistivity (or its inverse, conductivity) of the formation by first inducing eddy currents to flow in the formations in response to an AC transmitter signal, and then measuring a phase component signal in a receiver signal generated by the presence of the eddy currents. Variations in the magnitude of the eddy currents in response to variations in formation conductivity are reflected as variations in the receiver signal. Thus, in general, the magnitude of a phase component of the receiver signal, that component in-phase with the transmitter signal, is indicative of the conductivity of the formation.

In theory, the electrical resistivity of the formation should be relatively high (or the conductivity relatively low) when the formation contains a high percentage of hydrocarbons because hydrocarbons are relatively poor conductors of electricity. Where hydrocarbons are not present in the formations and the formations contain salt water, the electrical resistivity of the formation should be relatively low. Formation water, typically salty, is a relatively good conductor of electricity. Induction resistivity logging tools thus obtain information about the formations which can be interpreted to indicate the presence or absence of these hydrocarbons.

U.S. Pat. Nos. 2,582,314; 3,340,464; 3,147,429; 3,179,879 and 3,056,917 are illustrative of typical prior art well logging tools which utilize the basic principles of induction logging. In each of the tools disclosed in these patents, a signal generator operates to produce an AC transmitter signal which is applied to a transmitter coil. The current in the transmitter coil induces in the formations a magnetic field, which, in turn, causes eddy currents to flow in the formations. Because of the presence of these formation currents, a magnetic field is coupled into a receiver coil R thereby generating a receiver signal. (Logging tools having "a receiver coil" and "a transmitter coil" each comprising several coils arranged in a predetermined geometrical fashion to obtain a desired response are commonly used. These coil systems are sometimes referred to as "focused" coil systems.) The receiver signal is then amplified and applied to one or more phase sensitive detectors (PSDs). Each PSD detects a phase component signal having the same phase as a phase reference signal which is also applied to the detector. The phase reference signal has a predetermined phase relationship to the current in the transmitter coil(s). The output of the PSD(s) may be further processed downhole, or may be sent uphole to surface equipment for processing or display to an operating engineer.

A quantitative determination of the conductivity of the formations is based in large part on the value obtained for the phase component signal that is in-phase with the transmitter current in the transmitter coil. This component signal is commonly referred to as the real or in-phase (R) component. Measurement of a phase component signal which has a phase orthogonal to (or, in quadrature to) the transmitter current is sometimes obtained. This component signal is commonly referred to as the quadrature-phase (X) component signal.

Measurement of both the R and X phase component signals of the receiver signal is known. U.S. Pat. Nos. 3,147,429 and 3,179,879 both disclose induction logging apparatus which detects real and phase quadrature components (designated in those patents as $V_r$ and $V_x'$, respectively) of the receiver signal from the receiver coil. The tools disclosed in these patents show the output from a receiver amplifier being applied to ideally identical PSD circuits, one for detecting the R component signal and the other for detecting the X component signal. Appropriate phase shifting components are provided for generating the phase quadrature phase reference signals required by the PSDs in order to resolve the phase component signals. Recent advances in the area of digital induction logging apparatus, such as those disclosed in co-pending U.S. patent application Ser. No. 217,367, filed June 8, 1981, which is incorporated herein for all purposes and is entitled "A Digital Induction Logging Tool," have enabled accurate and precise readings of the R and X component signals to be made. Application Ser. No. 271,367 is assigned to the same Assignee as the present application.

In addition to the hardware limitations addressed by the system disclosed in the incorporated patent application, the methods for determining true formation resistivity at any particular depth from induction log measured data have in the prior art been adversely affected in cases where the true conductivity of adjacent bedding formations varies over a wide dynamic range.

To interpret the tool voltage measurements representative of the true formation conductivity requires a sonde response function relating formation conductivity to output voltage measurements of the tool. This sonde response function is typically known as the vertical sensitivity curve of the induction tool sonde. For homogeneous formations, the sonde response function for a typical induction sonde can best be described as a response curve which has a main lobe of finite width from which the majority of the signal originates. Sidelobes to each side of the main lobes with non-zero amplitudes extend longitudinally up and down the borehole from the center of the sonde with decreasing amplitude.

A term widely used by those skilled in the art to describe this sonde response function is the "vertical geometrical factor" of an induction tool. The vertical geometrical factor (GF) is the sonde response function measured in a homogeneous formation having zero conductivity (infinite resistivity). As is discussed below, the character of the sonde response function varies with the conductivity of the formations being investigated. Thus, the GF is a special situation (zero conductivity) for the sonde response function. The condition of zero conductivity is not often encountered in induction logging, although low conductivity formations are regularly encountered. The term, general geometrical factor (GGF), is often used to describe the sonde response function regardless of the conductivity at which a given response curve is obtained.

Because of the non-zero sidelobes of the sonde response function, currents flowing in the formations above and below the sonde provide an unwanted contribution to the log measurements. For example, where the main lobe of the sonde response function is investigating a thin bed of low conductivity, the conductivity measurement will be too large if the thin bed is located near adjacent beds of higher conductivity. This unwanted contribution is referred to by those skilled in the art as the "shoulder effect," and generally is meant to describe the incorrect interpretation of the sonde measurements resulting from the non-zero sidelobes in the sonde response function.

The character of these sidelobes of the sonde response function has in the past been controlled by the geometry of the sonde coupled with the physics of induction logging. Various attempts have been made in the past to minimize these sidelobes, for example, using multiple transmitter and receiver coils arranged in predetermined relationships within the sonde itself. U.S. Pat. Nos. 2,582,314 and 3,067,383 illustrate induction logging sondes in which multiple coils arranged in arrays are used to "focus" the sonde response function response curve to narrow the width of the main lobe and attenuate the sidelobes. U.S. Pat. No. 2,790,138 discloses an induction logging tool in which two separate induction coil arrangements are used, both arrangements having the same geometrical center with an inner transmitter-receiver coil pair physically located between an outer transmitter receiver coil pair. Assuming that both coil pairs have the same sidelobe responses at vertical displacements greater than some fixed distance from the center of the sonde, by subtracting the signal from one coil pair from the other will reduce the effect of the contribution of formations spaced apart from the center of the sonde beginning at the fixed distance outwardly.

These focused coil systems, and such techniques as disclosed in U.S. Pat. No. 2,790,138, have not been able to effectively reduce the sidelobes of the sonde response function to a level which will permit the logging tool to measure the conductivity of the formations accurately over several decades of magnitude. Because of the complexity of these focused coil arrangements, and the problems of mutual coupling and the difficulty in constructing the sonde, resort to more elaborate focused arrangements to further reduce the sidelobes has already reached a point of diminishing returns.

In addition to the shoulder effect phenomenon discussed above, there is yet another problem which limits the ability of the induction logging equipment to accurately obtain a measure of the true conductivity of the formations over a wide dynamic range. This problem is characterized by the non-linear changes in the profile of the sonde response function as a function of formation conductivity. As the conductivity of the formation being investigated increases, the amplitude and shape of both the sonde response function's main lobe and its sidelobes changes, and these changes are non-linear with increasing conductivity. This characteristic is referred to as "skin effect." The skin effect phenomenon has also been described as that error signal which degrades the in-phase component measurement of the conductivity to produce an incorrect value. This skin effect phenomenon results primarily from the mutual interaction with one another of different portions of the secondary current flow in the formation material. The magnitude of this skin effect phenomenon also increases as the system operating frequency increases.

Prior art has shown that, among other things, the magnitude of this skin effect phenomenon is a complex and complicated function of the coil system operating frequency, the effective length of the coil system, and the conductivity value of the adjacent formation material. The last-mentioned factor renders this phenomenon particularly objectionable because it produces the above-mentioned non-linear variation in the output signal of the sonde. The occurrence of these non-linear variations can be substantially eliminated for a large range of formation conductivity values by proper choice of the coil system, operating frequency and the effective coil system length. These factors, however, place undue restraints on the construction and operation of the coil and associated circuits. These restraints, in turn, limit other desirable features of the coil system apparatus. For example, it is frequently desired that the coil system be able to accurately determine the conductivity value of the formation material in a region lying at a substantial lateral distance from the borehole. This requires a relatively large coil spacing or coil system length. A large spacing, however, increases the percentage of non-linearity resulting from the occurrence of skin effect. As another example of undesirable restraint, the signal-to-noise ratio of the induction logging apparatus can be improved by increasing the tool's operating frequency. This, however, also increases the skin effect non-linearity.

If the conductivity of the formations being investigated is near zero, the GF response curve yields values of conductivities that are free of the skin effect phenomenon. But at higher conductivities, the skin effect, as reflected as a change in the sonde response function, causes the conductivity values obtained from the measurements of the tool to be in error. U.S. Pat. No. 3,147,429 characterizes this skin effect error as a voltage which subtracts from the "geometrical factor" signal predicted by the linear theory on which the GF response curve is based and which is well-known in the art. U.S. Pat. No. 3,147,429 also discusses the skin effect phenomena as it relates to the quadrature-phase component X of each conductivity measurement. Those skilled in the art have recognized that the magnitude of the X component is a function of the conductivity value of the formation material being investigated.

The logging system of U.S. Pat. No. 3,147,429 assumes that, to a degree, the magnitude of the quadrature-phase component measurement X is equal to the magnitude of the skin effect error signal. Since the skin effect error signal tends to decrease the measurement from that which would obtain if the GF were the proper response curve for the formations being investigated, the in-phase component measurements can be corrected by adding an adjusted quadrature-phase component where the adjustment is made dependent on the magnitude of the X component. While this approach yields some correction to the in-phase component measurement for the skin effect error, there is no attention given in the prior art to the origin within the formation from where the skin effect error signal originates. Rather, the prior art corrects for skin effect based only on the magnitude of the component of the conductivity measurement itself. In other words, the spatial aspects of the skin effect error signals are totally ignored by the prior art.

As shown in the case of the shoulder effect phenomenon previously discussed, a consideration of the spatial aspects of the system transfer function is important if a true and accurate measurement of the formation conductivity over a wide dynamic range of conductivities is to be obtained. The skin effect error also has a spatial aspect, because the conductivity of the formations being investigated may not be homogeneous throughout or that the formations adjacent the borehole may be invaded by the drilling mud. The shape and character of the spatial response function for the skin effect error signal can be defined as the difference between the GF response curve and the sonde response curves as measured at different values of conductivity. For these curves, it can be seen that the contributions of formations longitudinally displaced along the borehole from the point of the measurement contribute varying amounts to the skin effect error signal, even when a homogeneous medium is assumed. A gross adjustment to the in-phase component measurement based on a pure magnitude reading for the quadrature-phase component is not adequate to compensate for the skin effect phenomenon so as to permit accurate measurements of the true conductivity over a wide dynamic range in conductivity. Attention must be given to compensating the in-phase measurement based on the contributions to the skin effect error coming from the various parts of the formations.

Thus, it would be advantageous to provide a method of processing the induction log measurements and a system therefor that reduces the unwanted contributions in the log measurements from currents flowing in formations spaced apart from the measurement depth by minimizing the sidelobes in the resulting system response function used to translate the formation conductivity values into the processed measurements. It would also be advantageous to provide a method of processing the induction log measurements to minimize the effects of the non-linear variations in the sonde response function resulting from changes in the conductivity of the formations being investigated.

SUMMARY OF THE INVENTION

In accordance with the present invention, a system and method of processing induction log measurements to compensate for changes in the induction sonde response function due to skin effect is disclosed. The log consists of measurements of the sub-surface formations taken by an induction logging system at various depths in a borehole in the earth. Each log measurement consists of an in-phase R and a quadrature-phase X component. The logging system is characterized by a spatial domain sonde response function having real and imaginary components which vary with the conductivity of the sub-surface formations being investigated, where the real component of the sonde response function transforms the formation conductivity distribution into the in-phase measurements and the imaginary component transforms the formation conductivity distribution into the quadrature-phase components.

The method is characterized by the steps of filtering the quadrature-phase component measurements according to a predetermined spatial filtering function to obtain correction component measurements. These correction component measurements represent the change in the sonde response function as a function of formation conductivity. After obtaining the correction component measurements, they are summed with the in-phase component measurements to obtain the processed log measurements in which the variations in the sonde response function to variations in the conductivity of the formations being measured are reduced.

The step of filtering the quadrature-phase component measurements comprises the steps of determining the difference between the sonde response function obtained at zero conductivity and the sonde response function at various formation conductivities with the difference functions thus obtained comprising skin effect error functions. Each skin effect error function is then deconvolved with a first filter function. A second filter function is then determined which when applied to the imaginary component of the sonde response function generates a function equal as possible to the deconvolved skin effect error functions at each value of conductivity. The second filter function comprises the predetermined spatial filtering function.

In a narrower aspect of the invention, the above method of processing an induction log to reduce the effects of variations in the sonde response function with formation conductivity further includes the steps of deconvolving the in-phase component measurements with a deconvolution filter obtained from the geometrical factor of the logging sonde disregarding variations in the sonde response function with conductivity, and summing the processed in-phase component values with the correction component measurements. Each processed log measurement thus obtained is compensated for the effects of variations in the sonde response function with formation conductivity and the unwanted contributions in each measurement from formation currents flowing in formations spaced apart from the measurement depth. (For purposes of this disclosure, hereinafter, any reference to the frequency of a function refers to its spatial frequency as distinguished from a frequency which is time dependent.)

BRIEF DESCRIPTION OF THE DRAWINGS

For a fuller understanding of the present invention, reference should be had to the following detailed description taken in connection with the accompanying drawings, in which:

FIG. 12 is a block diagram representation of the phasor processing implementation of the present invention which reduces shoulder effect and skin effect in the processed resistivity log;

Similar reference numerals refer to similar parts throughout the drawings.

DETAILED DESCRIPTION OF THE PREFERRED EMBODIMENT OF THE PRESENT INVENTION

Figure 1:
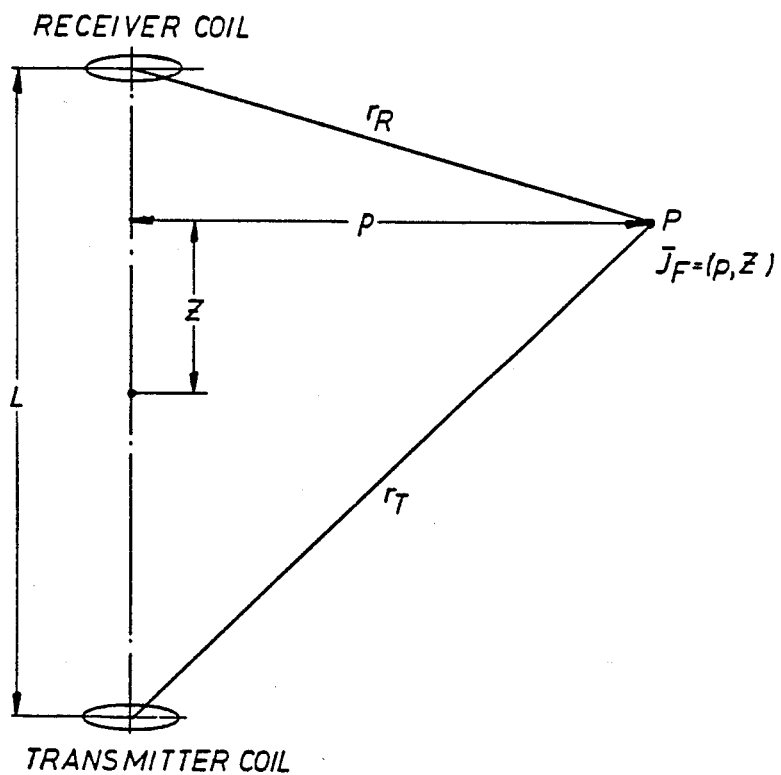
FIG. 1 is a diagrammatic representation of the induction geometry for a two-coil induction sonde showing the formation induced current at point P in the formation.

Referring to the figures and first to FIG. 1, a diagrammatic representation of the induction geometry for a two-coil sonde (one transmitter coil and one receiver coil) is shown. For purposes of this disclosure, the derivations presented are based on the theory of induction logging as developed for this simple two-coil arrangement. In practice, however, the coil arrangement for a typical induction sonde is more complex. Even though more complex, the present invention is equally applicable to the log measurements obtained by these more complex coil sondes because the response of a complex sonde is the linear combination of two-coil sondes.

Figure 4:
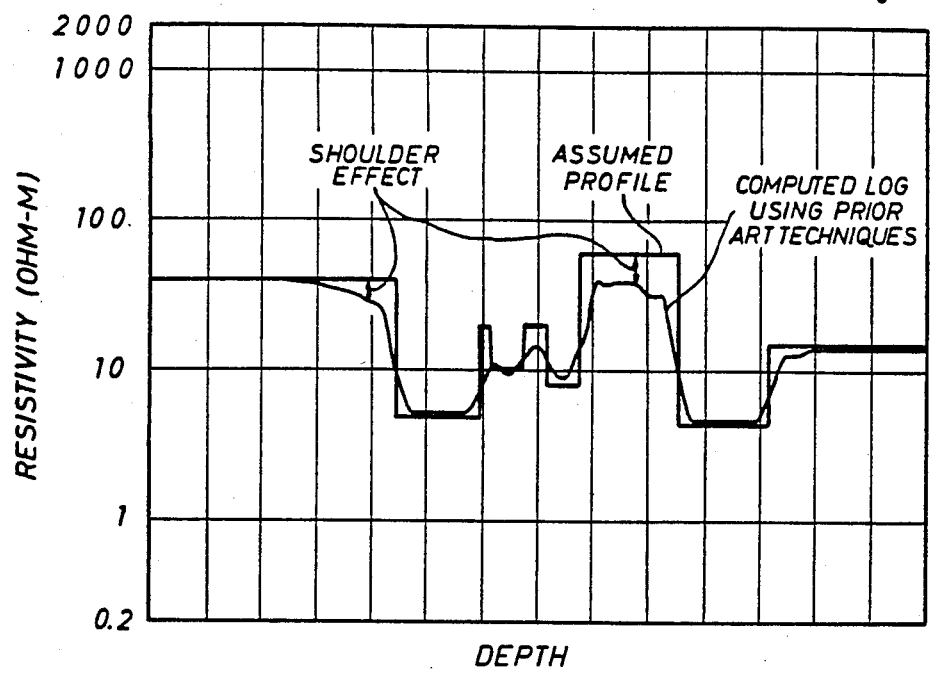
FIG. 4 is a plot of an assumed profile of formation resistivity (inverse of conductivity) and the resistivity obtained by typical prior-art techniques.

Two difficult problems in induction logging are correcting measurements for shoulder effect and skin effect. Shoulder effect is the unwanted contribution to the measured conductivity of a thin bed (of low conductivity) by currents flowing in adjacent more conductive beds. This unwanted contribution results in a measured conductivity that is too large. FIG. 4 illustrates a test section of a hypothetical log showing an assumed profile (see also FIGS. 6 and 8) for the true formation resistivity and the resistivity log obtained from the prior-art methods of processing the induction log measurement (see U.S. Pat. No. 3,166,709 for a disclosure of one prior-art method of calculating the resistivity of the formations from the measurements). Where the true resistivity values are high (low conductivity) followed by a change to low resistivity (high conductivity), an error is seen between the true resistivity and the calculated values. This difference represents the "shoulder effect."

Skin effect is the non-linear response of the induction device to increasing formation conductivity causing the measured conductivity to be less than directly proportional to the true formation conductivity. This non-linearity is due to the attenuation and phase shift of the electromagnetic waves in the conductive formations. The theory of induction logging and this skin effect phenomena have been discussed extensively in the prior art. The article by Henri-Georges Doll appearing in the June, 1949 issue of the Journal of Petroleum Technology entitled "Introduction to Induction Logging and Application to Logging of Wells Drilled With Oil Base Mud," pages 148–162 ("Doll article"), and the article by J. H. Moran and K. S. Kunz appearing in Vol. 28, No. 6 of the December, 1962 issue of Geophysics and entitled "Basic Theory of Induction Logging and Application to Study of Two-Coil Sondes," pages 829–858 ("Moran article"), are representative treatments of the theory of induction logging. Additionally, U.S. Pat. No. 3,147,429 issued to J. H. Moran ("Moran patent") discusses in some detail the skin effect phenomenon.

Summarizing the material as presented in the above cited materials, the voltage measurements obtained by an induction logging tool are representative of the conductivity of the formation based on the geometrical factor theory (Doll article). Referring still to FIG. 1, the induced current $J_F(\rho,z)$ induced at a point P in the formations is the result of a transmitter current J of the form $I_o e^{i\omega t}$. This current induces an eddy current distribution in the surrounding formation which is related to the transmitter position and the formation conductivity distribution. The current flowing in the formation is computed by solving Maxwell's Equations for the appropriate boundary conditions.

This solution is described in general terms by the retarded potential solution which implies that the field giving rise to an eddy current at a given point in the formation is dependent on the magnitude of the current flowing in other parts of the formation. Alternatively, the field can be thought of as propagating through a dispersive medium. All interactive or propagation effects are described by the retarded potential solution, so, once the current distribution in the formation is computed, the voltage induced in the receiver coil by the formation currents can be computed by applying the Biot-Savart law and integrating over the volume containing eddy currents. Thus, $$V_M(z) \propto \frac{d\bar{B}_R}{dt}, \quad (1)$$

where $\bar{B}_R$ is the magnetic field at the receiver coil R, and is given by the following equation:

$$\bar{B}_R = \frac{\mu_0}{4\pi} \int_V \frac{\bar{J}_F \times \bar{r}_R}{r_R^3} dV. \quad (2)$$

This leads to a general solution for the receiver signal in terms of the formation conductivity distribution $\sigma_F(\rho,z,\phi)$ (using cylindrical coordinates $\rho,z,\phi$ to represent the formation coordinates)

$$\sigma_M(z) = \int_0^{2\pi} \int_{-\infty}^{\infty} \int_0^{\infty} g(\rho - \rho', z - z', \phi - \phi', \sigma_F) \sigma_F(\rho', z', \phi') d\rho' dz' d\phi'. \quad (3)$$

Here, the function $g(\rho,z,\phi,\sigma_F)$ represents both the geometrical parts of the coupling and the propagation parts. $\sigma_M(z)$ is the receiver signal in units of conductivity at the position $\rho=0,z$. The function $g(\rho,z,\phi,\sigma_F)$ maps the formation conductivity $\sigma_F(z)$ into the measured signal $\sigma_M(z)$.

In the homogeneous medium, $g(\rho,z,\phi,\sigma_F)$ is given by $$g_{HOM} = \frac{L}{4} \frac{\rho^3}{r_R^3 r_T^3} [(1 - ikr_T)e^{ikr_T} + (1 - ikr_R)e^{ikr_R}], \quad (4)$$

where
L is the coil spacing,
$k^2 = i\omega\mu\sigma_F$ is the propagation constant,
$r_T$ is the vector distance from the transmitter coil to the formation element $(\rho,z)$, and
$r_R$ is the vector distance from the receiver coil to the formation element $(\rho,z)$
(the $\phi$ dependence disappearing due to the cylindrical symmetry).

Equation 3 does not represent a proper convolution, for the function $g(\rho,z,\phi,\sigma_F)$ is not linear. That is, $$\int_V g \alpha \sigma_F dV \neq \alpha \int_V g \sigma_F dV. \quad (5)$$

However, the function g will be referred to as the induction sonde response function because it does describe the mapping of the formation conductivity distribution into the received signal at the point $\rho=0$, z. The function g is, obviously, different at each point along the borehole.

The following derivation considers only cylindrically symmetric formation geometries so the integration over $\phi$ disappears. Since the measured signal is constrained by the borehole to be a function of z only, integration over $\rho$ obtains the vertical spatial sonde response function g given as follows:

$$g(z, \sigma_F) = \int_0^{\infty} g(\rho, z, \sigma_F) d\rho. \quad (6)$$

The mapping function $g(z,\sigma_F)$ is, like the general function in Equation 3, a function of $\sigma_F(z)$ and is non-linear with linear changes in $\sigma_F(z)$. The following mapping operation $$\sigma_M = \int_{-\infty}^{\infty} g(z - z', \sigma_F) \sigma_F(z') dz' \quad (7)$$

is also not a proper convolution so the concept of a linear devonvolution is not applicable.

However, in the limit of low conductivity, Equation 4 reduces to $$g_{GF} = \frac{L}{2} \frac{\rho^3}{r_R^3 r_T^3}, \quad (8)$$

where $g_{GF}(z)$ is the geometrical factor of the induction sonde and is constant over all formation conductivities. The function $g_{GF}(z)$ is not an accurate description of the induction response at higher condutivities, but the present invention uses $g_{GF}(z)$ as the basis for the development of a deconvolution method.

The convolution of $g_{GF}(z)$ with the formation conductivity produces a "measurement," $\sigma_{GF}(z)$, given by:

$$\sigma_{GF} = \int_{-\infty}^{\infty} g_{GF}(z - z') \sigma_F(z') dz'. \quad (9)$$

This is what would be measured by an induction sonde if there were no skin effect, and represents a proper convolution. Equation 8, when integrated over $\rho$, gives the vertical geometrical factor of the Doll article:

$$g_{GF}(z) = \begin{cases} \frac{1}{2L} & |z| < \frac{L}{2} \\ \frac{1}{8z^2} & |z| > \frac{L}{2} \end{cases} \quad (10)$$

Since the measured signal $\sigma_M(z)$ given by Equation (7) is a complex quantity, $\sigma_M(z) = \sigma_R(z) + i\sigma_X(z)$, and the sonde response function is the weighting function which describes the contribution of the conductivity of each element of the formation to the measured conductivity referred to a given depth, g(z) must also be complex. Thus, $$g(z,\sigma_F) = g_R(z,\sigma_F) + ig_X(z,\sigma_F), \quad (11)$$

where $g_R(z,\sigma_F)$ is the real component of the sonde response function and is that response function which transforms the in-phase R component measurements and $g_X(z,\sigma_F)$ is the imaginary component of the sonde responser function which transforms the quadrature phase X components. While $g(z,\sigma_F)$ (and its components, $g_R(z,\sigma_F)$ and $g_X(z,\sigma_F)$) is both a function of depth (z) and conductivity ($\sigma_F$), hereinafter the discussion will be in reference to $g(z)$ as a function only of depth, unless otherwise stated, while recognizing that g(z) changes as the conductivity ($\sigma_F$) of the formation under investigation changes. Where $\sigma_F$ is approximately zero, g(z,$\sigma_F$) is real and is defined to be $G_{GF}(z)$, the geometrical factor of the induction sonde, and $\sigma_M = \sigma_R$.

Shoulder Effect Correction

Figure 2:
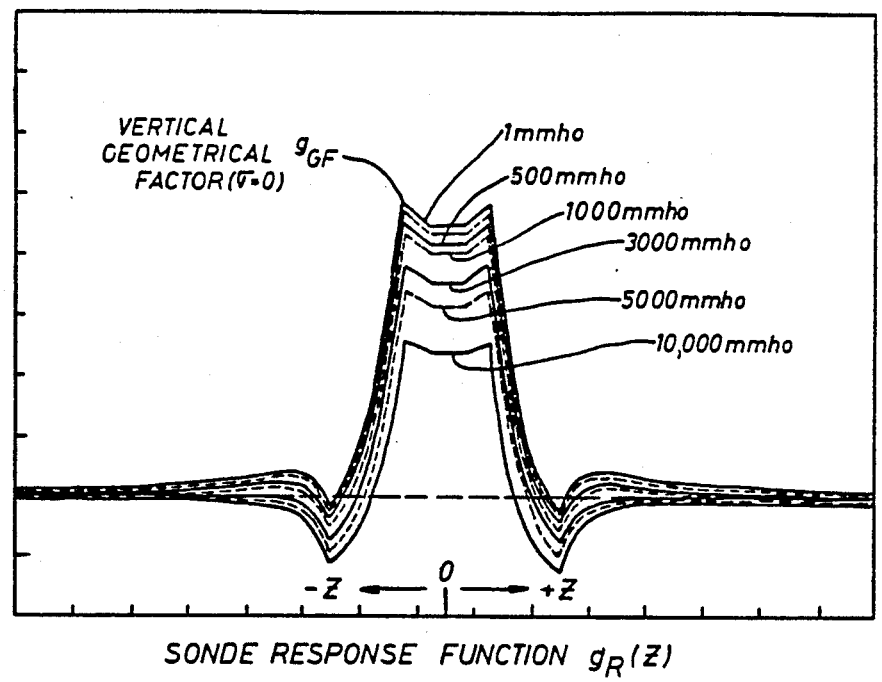
FIG. 2 is a plot of the real component of the sonde response transfer function of a typical induction logging sonde for various values of formation conductivity.

The origin of the coordinate system for the expression for the measurement $\sigma_M(z)$ is usually chosen so that the measurement point is on the line z equal to zero (see FIG. 1). As shown above, an expression for the sonde response function as a function of formation conductivity may be found by solving Maxwell's equations in the formation geometry at hand. (For example, see the article "A New Look At Skin Effect" by S. Gianzero and B. Anderson given at the S.P.W.L.A. 22nd Annual Logging Symposium June 23-26, 1981.) For homogeneous formations, the sonde response functions have been computed for a coil sonde used extensively in commercial resistivity logging activities as described in U.S. Pat. No. 3,067,383 and FIG. 2 illustrates the various computed sonde response functions $g_R(z)$ obtaining for different values of formation conductivity for that particular coil system. See for example the geometrical factor described in U.S. Pat. No. 2,582,314. At zero conductivity, the vertical geometrical factor GF curve is obtained. As can be seen from FIG. 2, the variations in the sonde response function are significant when the formation conductivity increases. As previously mentioned, the change in the sonde response function is non-linear with a linear increase in the formation conductivity.

Figure 3:
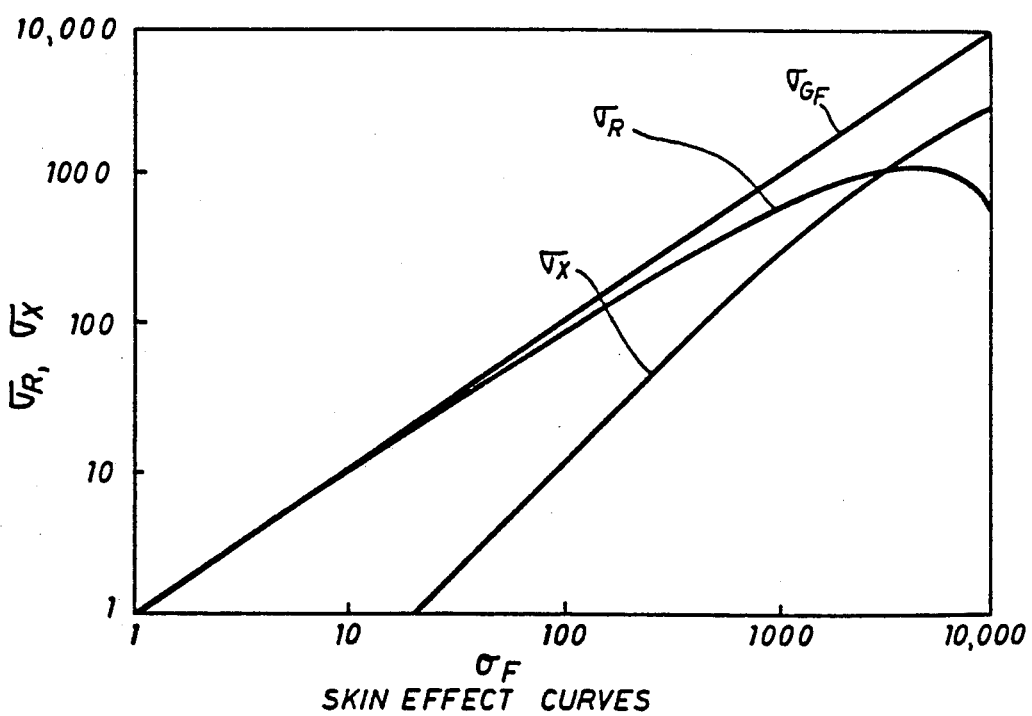
FIG. 3 is a plot of the curves illustrating skin effect in which measured conductivity is plotted against true conductivity for various values of formation conductivity.

The non-linearity of the sonde response function with increases in formation conductivity may be better understood by referring to FIG. 3 which is a plot of the real (R) and the quadrature-phase (X) components of each log measurement as functions of formation conductivity. As shown in FIG. 3, when the true formation conductivity ($\sigma_F$) is small, it is approximately equal to the in-phase component $\sigma_R$ of the log measurement. However, as $\sigma_F$ becomes larger, the $\sigma_R$ component measurements deviate from a true straight line (curve F). With increasing $\sigma_F$, the quadrature-phase component $\sigma_X$ also increases. Thus, for large values of $\sigma_F$, $\sigma_R$ deviates significantly from $\sigma_F$. (See for example U.S. Pat. No. 3,226,633.)

Referring to FIG. 2, the sonde response function $g_R(z)$ can be described as having a main lobe spanning a length of the borehole and symmetrical non-zero sidelobes which extend outwardly from the main lobe with tails that decrease in amplitude with increasing distance from the measure point. As the conductivity increases, these non-zero sidelobes increasingly become more negative with the main lobe decreasing in amplitude. These large negative lobes cause "horns" to appear on the log as the sonde passes from a region of high conductivity to one of low conductivity, and vice versa. p The sonde response function for an induction logging tool would ideally be a delta function $\delta(z-z')$ that maps the conductivity of an infinitesimally thin sheet of formation into the measured value of $\sigma_M(z)$ at each measurement depth. As FIG. 2 shows, the sonde response function for any realizable sonde is far from ideal, and each measurement will include the contributions from a volume of formation many feet thick.

Although the sonde response function does not describe an infinitesimally thin sheet of formation, but rather includes contributions from the conductivity of formations several feet in thickness, there could possibly exist an operator h(z) which would map the sonde response function g(z) into the ideal delta function $\delta(z-z')$. Thus, an expression for $\delta(z-z')$ would be written as:

$$\delta(z) = \int_{-\infty}^{\infty} h(z-z') g_{GF}(z') dz'. \tag{12}$$

Equation 12 can be rewritten in the frequency domain $\omega$ by performing a Fourier transform of both sides of equation 12, yielding:

$$\Delta(\omega) = H(\omega) G_{GF}(\omega) \tag{13}$$

Assuming that the conductivity is constant radially (non-invaded beds), in a homogenous medium, the apparent conductivity will be given by:

$$\sigma_M(z) = \int_{-\infty}^{\infty} g_{GF}(z-z') \sigma_F(z-z') dz', \tag{14}$$

where z' is the axial distance from the center of the sonde and $\sigma_F(z-z')$ is the true formation conductivity. Equation 14 is recognized as being of the form of the convolution integral of a linear time-invariant filter.

The Fourier transform of Equation 14 may be taken:

$$\Sigma_M(\omega) = G_{GF}(\omega) \Sigma_F(\omega), \tag{15}$$

where the spatial frequency, $\omega$, equals the reciprocal of distance. The article by C. F. George, et al., appearing in the February 1964 issue of Geophysics, entitled "Application of Inverse Filters to Induction Log Analysis," shows applying Fourier transforms to equations which characterize induction logging, and obtaining inverse filters to improve data processing of induction logs.

From Equation 13, if the ideal system transfer function $\Delta(\omega)$ is substituted for $G_{GF}(\omega)$ of equation 15, the apparent conductivity $\Sigma_M(\omega)$ should equal the transformed true conductivity $\Sigma_F(\omega)$. Thus, equation 15 becomes:

$$\Sigma_M(\omega) = H(\omega) G_{GF}(\omega) \Sigma_F(\omega). \tag{16}$$

Figure 5:
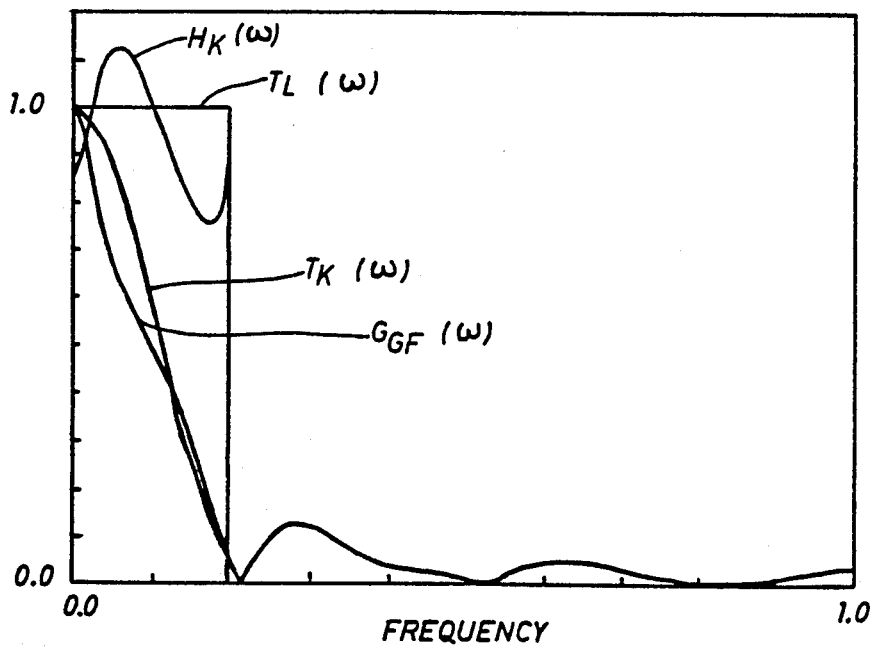
FIG. 5 is a plot of the Fourier transform curves used in obtaining the deconvolution filter response curves of the present invention.

Referring to Equation 16, if $H(\omega)$ is equal to the reciprocal of $G_{GF}(\omega)$, the measured conductivity, $\Sigma_M(\omega)$, will equal the formation conductivity $\Sigma_F(\omega)$. FIG. 5 shows the Fourier transform of $g_{GF}(z)$, $G_{GF}(\omega)$, for a typical induction logging sonde (see for example the sonde disclosed in U.S. Pat. No. 3,067,383.) The problem with defining $H(\omega)$ as equal to the reciprocal of $G_{GF}(\omega)$ is that $G_{GF}(\omega)$ vanishes at certain values of $\omega$, leaving $H(\omega)$ indeterminate. The specific values $\omega$ for which $G_{GF}(\omega) = 0$ are sometimes referred to in the art as "blind" frequencies.

An $H_L(\omega)$ can be mathematically described as:

$$H_L(\omega) = \begin{cases} \dfrac{1}{G(\omega)} & \omega \leq \omega_c \\ 0 & \omega > \omega_c, \end{cases} \tag{17}$$

where the frequency $\omega_C$ is less than the first blind frequency. A target transfer function $T_L(\omega)$ can be defined as:

$$T_L(\omega) = \begin{cases} 1 & \omega \leq \omega_c \\ 0 & \omega > \omega_c. \end{cases} \quad (18)$$

In other words, $T_L(\omega)$ is the ideal low-pass filter curve shown in FIG. 5.

Figure 6:
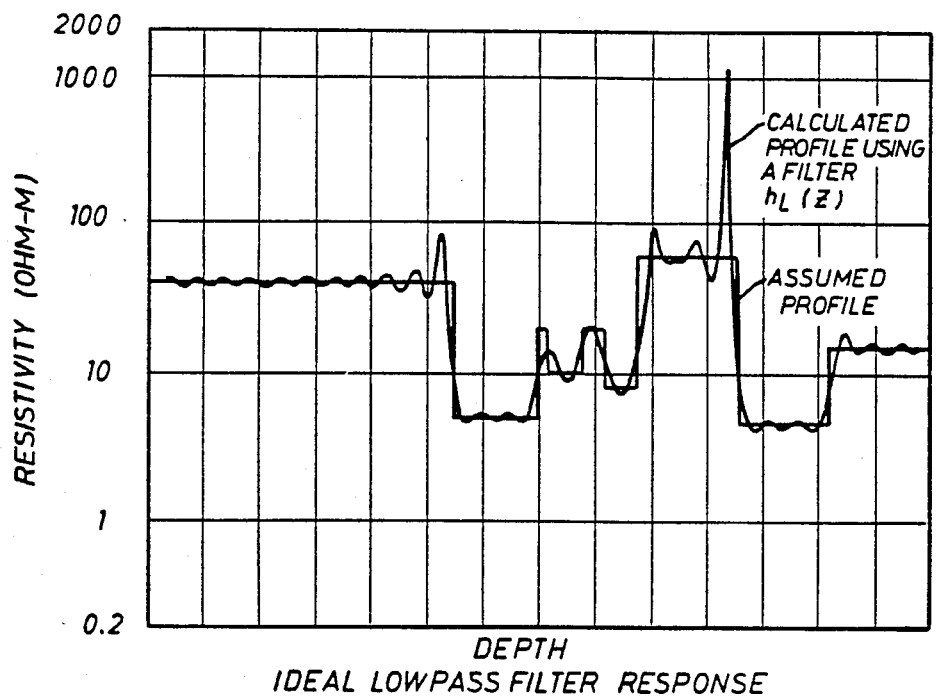
FIG. 6 is a plot showing the assumed profile for resistivity and the calculated profile using the ideal low-pass filter response curve as shown in FIG. 5.

For the target transfer function $T_L(\omega)$, as given in Equation 18, the calculated resistivity values for an assumed profile of resistivity of the formation as shown in FIG. 6 will result. The target transfer function $T_L(\omega)$, being defined as an ideal low-pass filter, has the property of having the widest bandwidth for a particular cut-off frequency, but it suffers from the Gibbs phenomenon represented by overshoot and ringing (ripple) in the calculated resistivity values, clearly illustrated in FIG. 6. Where such ripple is present in the calculated resistivity values in the presence of abrupt changes in the resistivity of the formations, the induction logging system would not be able to obtain accurate and precise readings of the formation conductivity or resistivity over a wide dynamic range, although some measure of improvement in the shoulder effect is obtained.

To obtain accurate and precise readings of conductivity over a wide dynamic range, however, the ripple illustrated in FIG. 6 must be eliminated. The present invention minimizes Gibbs phenomenon by replacing the target transfer function defined by Equation 18 with a target transfer function $T_K(\omega)$ such that when $t_K(z)$, the inverse Fourier transform of $T_K(\omega)$, is convolved with the formation conductivity profile $\sigma_F(z)$, the resulting log, $\sigma_P(z)$, will have minimum ripple in response to step changes in formation conductivity.

In the preferred embodiment of the present invention, the target transfer functions $T(\omega)$ is a Kaiser window function. Kaiser window functions are known in the art of finite-duration impulse response (FIR) digital filters. (The article appearing in Vol. 28, No. 1, of the IEEE Transactions on Acoustics, Speech and Signal Processing, February, 1980, and entitled "On the Use of the $I_0$-Sinh Window for Spectrum Analysis," pages 105–107, discloses a Kaiser window function.)

Although a Kaiser window function is disclosed for the target transfer function to reduce the shoulder effect, the present invention is not limited to only this use. The target transfer function could be any function which will perform a transformation to obtain any desired system response function based on the geometrical factor. For example, a target transfer function could be choosen to produce a system response function which transforms medium depth conductivity measurements to appear as deep investigation log measurements.

Thus, Equation 17 may be rewritten as:

$$H_L(\omega) = \begin{cases} \dfrac{T_L(\omega)}{G_{GF}(\omega)} & \omega \leq \omega_c \\ 0 & \omega > \omega_c. \end{cases} \quad (19)$$

FIG. 5 illustrates both the Kaiser window function $K(\omega)$ and the filter transfer function $H_K(\omega)$ which results from the ratio of $T_K(\omega)$ to $G_{GF}(\omega)$ for frequencies $\omega$ less than or equal to $\omega_C$.

Using techniques well-known to those skilled in the art, such as the Remez exchange method, it is possible to determine a linear-phase finite digital impulse response filter which implements the spatial domain filter function h(z) obtained from the inverse Fourier transformation of $H(\omega)$ of Equation 19. The Remez exchange method appears in the book entitled "Theory and Applications of Digital Signal Processing" by Rabiner and Gold, pp. 187–204 (1975).

Figure 7:
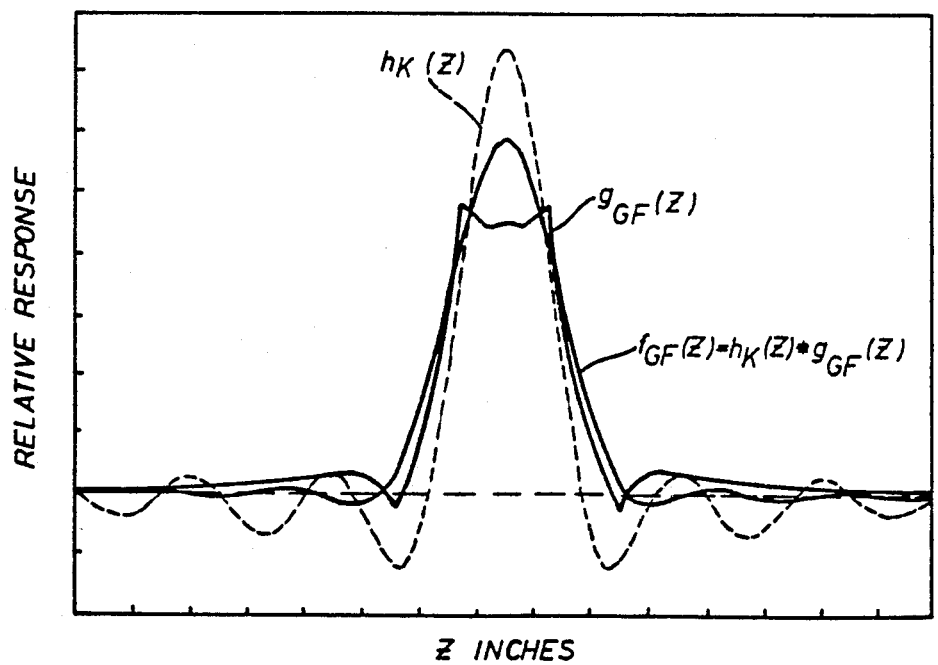
FIG. 7 is an overlay plot of the vertical geometrical factor $g_{GF}(z)$ as shown in FIG. 2, the deconvolution filter response function $h_K(z)$ of the present invention and the equivalent system response function $f_{GF}(z)$ after deconvolution of $g_{GF}(z)$ with $h_K(z)$.

FIG. 7 is an illustration of the sonde response function $g_R(z)$ for the typical focused coil system, the response functions of which are shown in FIG. 2. The zero formation conductivity $g_{GF}(z)$ curve is shown with the spatial filter function $h_K(z)$ obtained from equation 19 and the system transfer function $f_{GF}(z)$ as given by $$f_{GF}(z) = h_K(z) * g_{GF}(z), \quad (20)$$

where the * symbol represents the convolution operation. For the preferred embodiment of the invention, Table 1 (appearing at the end of the specification) illustrates the coefficients for a digital implementation of $h_K(z)$ according to the Remez exchange method. The filter implementation is symmetrical about a center coefficient and contains a total of 199 terms.

Figure 8:
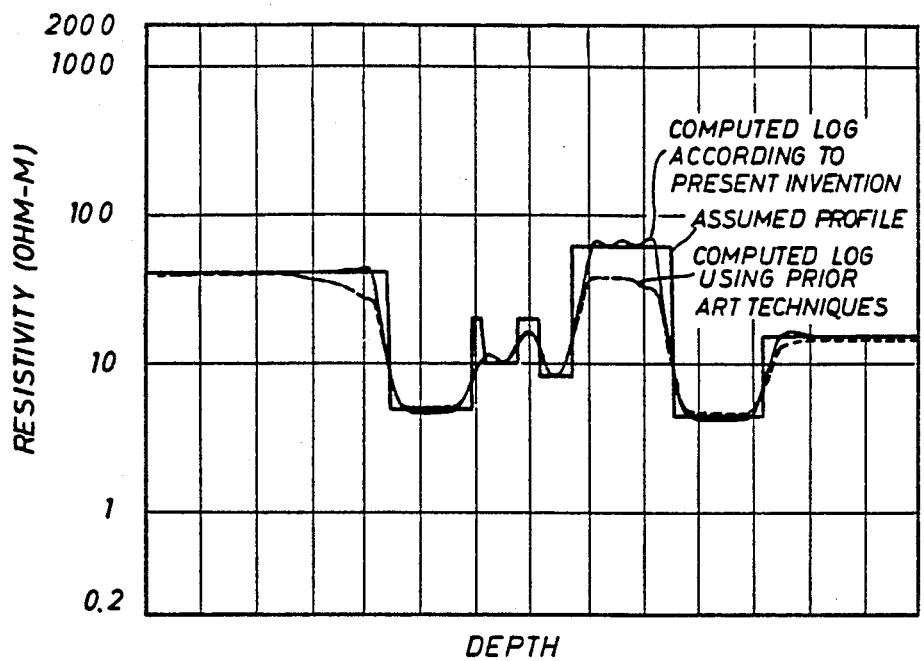
FIG. 8 is a plot showing the assumed profile of the formations for resistivity along with the resistivity calculated using the prior-art computing techniques and the deconvolution filter techniques of the present invention.
Figure 9:
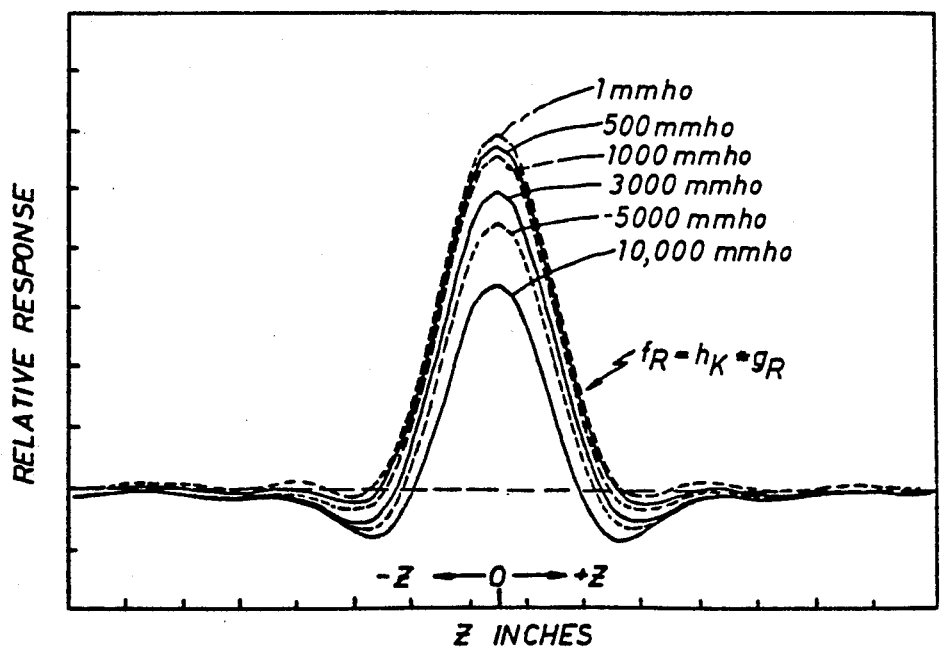
FIG. 9 is a plot of the deconvolved real component of the system response function $f_R(z)$ obtained at various values of formation conductivity.

It can be seen from FIG. 7 that in the system response function $f_{GF}(z)$, the main lobe has been increased in amplitude and sharpened (narrowed), and the sidelobes attenuated with the sidelobe tails rapidly dying out to zero. Thus, the contributions from currents flowing in the formations spaced apart from the measurement depth are substantially attenuated when the filter $h_K(z)$ is used to transform the measurement $\sigma_M(z)$ into the calculated conductivity values $\sigma_P(z)$ for the log. FIG. 8 illustrates the dramatic improvement in the calculated resistivity values by the application of the deconvolution filter $h_K(z)$ according to the present invention to the measured conductivity values $\sigma_M(z)$, where the conductivity readings are small (little skin effect). FIG. 9 illustrates the system response functions which result from the application of the deconvolution filter method to the plurality of sonde response functions as illustrated in FIG. 2.

Thus far, the method for obtaining a deconvolution filter based on the geometric factor theory has been described. That is, a method in which the skin effect phenomenon is negligible, $\sigma_F(z)$ is small. The techniques of determining a deconvolution filter can, however, be obtained for the sonde response functions $g_R(z)$ (see FIG. 2) obtained at any given conductivity value. Thus, each of the curves illustrated in FIG. 2 could be processed to obtain a deconvolution filter for processing induction measurements $\sigma_R(z)$. However, accurate values for the calculated conductivity are only possible when using these filters if the true formation conductivities are essentially equal to the same conductivity value which yielded the sonde response function $g_R(z)$ used in obtaining the applied deconvolution filter h(z). If the conductivity values vary by any significant amount from that value, the deconvolution filter thus applied (and the deconvolution filter obtained for $g_{GF}(z)$ with $\sigma_F(z)$ significantly greater than 0) will produce erroneous values for the computed conductivity $\sigma_D(z)$.

As previously discussed, the sonde response function g(z) depends on the formation conductivity in a highly non-linear manner. This dependence is referred to as skin effect, and causes large errors in the deconvolution at high conductivities, regardless of what method of reducing shoulder effect is used. (See U.S. Pat. No. 3,166,709 for a prior-art method to reduce the shoulder effect phenomenon. U.S. Pat. No. 3,166,709 is incorporated herein for all purposes.) Thus, the ideal situation should not only have a system response function which represents an infinitesimally thin sheet of formation, it should be constant regardless of the formation conductivity. In accordance with the present invention, one method of obtaining a constant system response function is to adapt the deconvolution filter h(z) obtained according to the inverse Fourier transform of Equation 19 to the conductivity of the formations.

In adapting the deconvolution filter method, there are two basic approaches. The first approach is to determine various deconvolution filters for different conductivity ranges. Based on a control signal, an appropriate deconvolution filter may be selected from among the plurality of deconvolution filters and applied to the log measurements. For example, deconvolution filters may be obtained for the sonde response functions obtained for conductivities of 1, 500, 1,000, 3,000, 5,000 and 10,000 mmho/m. FIG. 9 illustrates the system response functions which result from the deconvolution filters obtained for the sonde response functions measured at 1, 500, 1000, 3000, 5000 and 10,000 mmho/m. For the control signal, the quadrature component of the conductivity measurements $\sigma_X(z)$ is used since the value of this component is dependent on the skin effect.

A second approach for adapting the deconvolution filter method of reducing shoulder effect to also reduce skin effect is to continually adapt the coefficients of the digital deconvolution filter implementation of each deconvolution filter h(z) based on a control signal, such as the quadrature-phase component $\sigma_X(z)$. For this method, a digital filter implementation of the deconvolution filter response function h(z) is determined in which the digital filter has a fixed number of coefficient values. For a plurality of formation conductivities, the deconvolution filters are implemented by this digital filter. From these implementations, each coefficient will have a plurality of values defining a coefficient function, one value of the function taken from each filer implementation. By curve fitting the best curve to the plurality of values for each coefficient obtained from the implementation of the plurality of deconvolution filter response functions, it is possible to obtain a plurality of coefficient functions in which the value of each coefficient is now a function of a conductivity variable. Since the quadrature-phase component of the induction log measurements is dependent on the magnitude of the skin effect, $\sigma_X(z)$ can be used as the conductivity variable in the coefficient functions. It is then possible to continuously determine the coefficients of the best deconvolution filter to use in calculating the resistivity log measurements.

Skin Effect Correction

For any formation, the "skin effect error signal," $\sigma_S(z)$, may be defined as the difference between the actual measured signal $\sigma_M(z)$ and the geometrical factor signal defined by Equation 9, $$\sigma_S(z) = \sigma_{GF}(z) - \sigma_M(z). \quad (21)$$

In simple formation geometries, $\sigma_{SR}(z)$ can be easily computed. At a given measure point, Equation 21 can be rewritten as the mapping integrals $$\int_{-\infty}^{\infty} g_S(z-z', \sigma_F)\sigma_F(z')dz' = \int_{-\infty}^{\infty} g_{GF}(z-z')\sigma_F(z')dz' - \quad (22)$$

$$\int_{-\infty}^{\infty} g_M(z-z', \sigma_F)\sigma_F(z')dz',$$

where the functions $g_S(z,\sigma_F)$ and $g(z,\sigma_F)$ are the response functions which respectively map the formation conductivity $\sigma_F$ into the skin effect term $\sigma_S(z)$ and the measured conductivity $\sigma_M(z)$.

It can be shown from the definitions of the response functions of Equation 22 that the same relation as given for the measurements in Equation 21 holds for the response functions, $$g_S = g_{GF} - g_M. \quad (23)$$

Because the measured signal $\sigma_M(z)$ is a complex quantity $(\sigma_R(z)+i\sigma_X(z))$ and the geometrical factor signal is perforce real, the error signal must also be complex. Therefore, using Equation 21, the following obtains:

$$\sigma_M = \sigma_R + i\sigma_X \quad (24)$$
$$= \sigma_{GF} - (\sigma_{SR} + i\sigma_{SX}).$$

Furthermore, the imaginary part of the error signal contains all the imaginary information, so we may set $\sigma_X(z) = -\sigma_{SX}(z)$. (For this derivation, the direct mutual coupling, which appears as a part of the X-signal, has been ignored.) The real parts then are $$\sigma_R = \sigma_{GF} - \sigma_{SR}, \quad (25)$$

which is identical to the skin effect signal development disclosed in the Moran article. A similar development to Equation 22 gives a relation between the corresponding response functions:

$$g_R = g_{GF} - g_{SR}. \quad (26)$$

Figure 10:
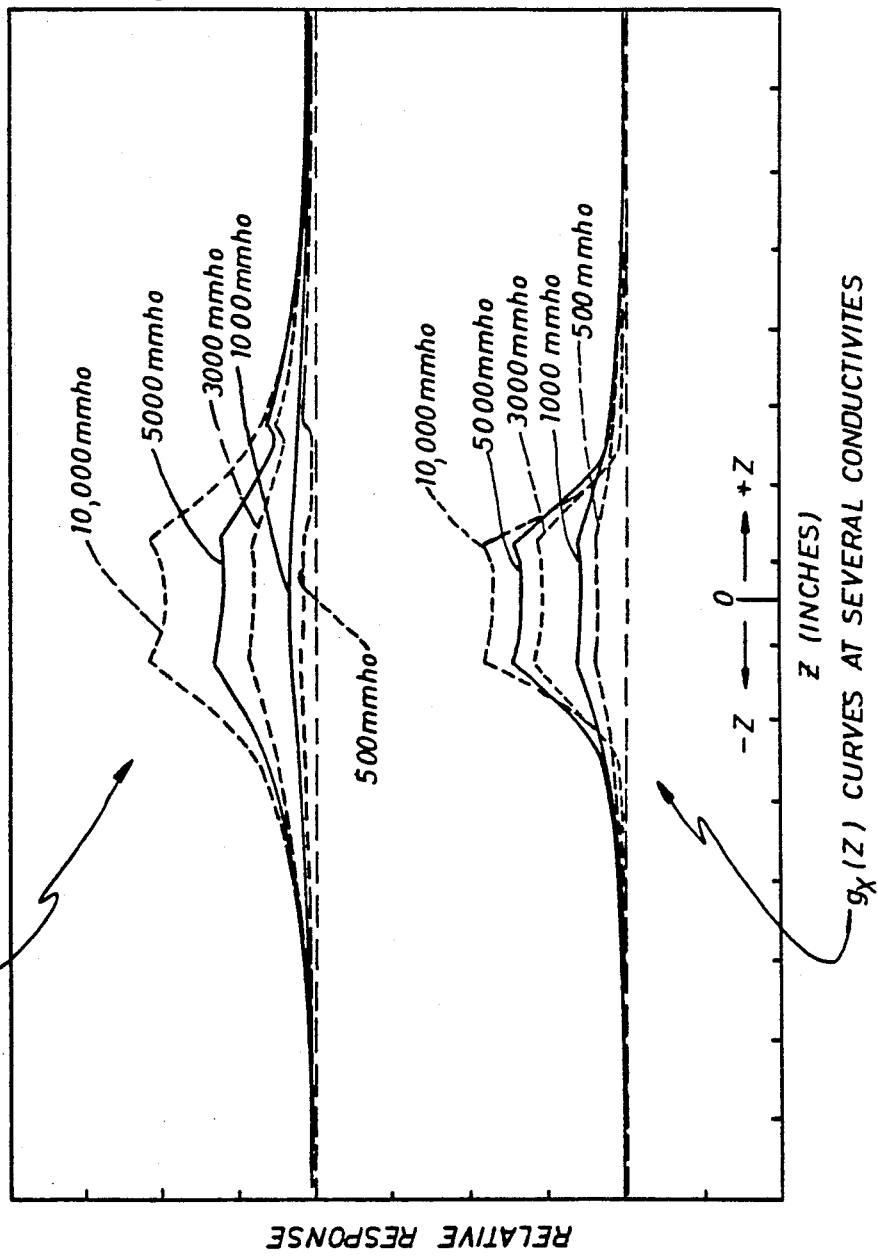
FIGS. 10(a) and (b) are, respectively, plots of the skin effect response function $g_{SR}(z)$ obtained at various values of formation conductivity and curves of the imaginary component of the sonde response function $g_X(z)$ obtained at various values of formation conductivity, both figures plotted to the same abscissa.

The function $g_R(z)$, computed using Equation 5 for a typical focused coil sonde commonly used in practice (see U.S. Pat. No. 3,067,383), is shown in FIG. 2. The function $g_{GF}(z)$ is also shown for comparison. FIG. 10(a) shows the error response function $g_{SR}(z)$ for several values of conductivity. The curves of FIG. 10(a) are obtained from the curves of FIG. 2 by taking the difference between $g_{GF}(z)$ and the $g_R(z)$ at selected value of $\sigma_F$ in accordance with Equation 23.

Although the mapping process involved in the induction measurement (Equation 7) is not a proper convolution, and no deconvolution exists per se, any filter may be applied to the sequence of measurements $\sigma_R(n)$, where n represents the $n^{th}$ sample of $\sigma_R(z)$ in a sequence of sampled log measurements. If h(n) represents a digital FIR filter of length N and is designed as an inverse filter for $g_{GF}(n)$, the application of h(n) to the sequence of measurements $\sigma_R(n)$ is expressed by the convolution sum, $$\sigma_{RD}(j) = \sum_{n=1}^{N} h(j-n)\sigma_R(n), \quad (27)$$

where $\sigma_{RD}(j)$ is the filtered measurement at the $j^{th}$ sample. Substituting for $\sigma_R(n)$ from Equation 25 gives $$\sigma_{RD}(j) = \sum_{n=1}^{N} h(j-n)\sigma_{GF}(n) - \sum_{n=1}^{N} h(j-n)\sigma_{SR}(n). \quad (28)$$

This expression contains the term $h*\sigma_{GF}$ (where * as mentioned above denotes the discrete convolution operation) which is the deconvolved signal free of skin effect. Equation 28 shows that application of the deconvolution filter to the in-phase R component signal can be thought of as a proper deconvolution of $\sigma_{GF}(n)$ plus the deconvolution error term on the right, the deconvolution of $\sigma_{SR}(n)$.

Left $g(z)$ represent any mapping function of the type $g(z,\sigma_F)$, such as $g_R(z,\sigma_F)$, or $g_{SR}(z,\sigma_F)$. Application of $h(n)$ to the signal resulting from mapping $\sigma_F$ with $g(z)$ gives:

$$\sum_{n=1}^{N} h(j-n)\sigma(n) = \quad (29)$$

$$\sum_{n=1}^{N} h(j-n) \int_{-\infty}^{\infty} g(z_n - z', \sigma_F)\sigma_F(z')dz'.$$

where $z_n$ is the position of the $n^{th}$ sample.

Since the filter coefficients for $h(n)$ are constants, the summation can be taken into the integral (as long as $\sigma_F$ remains fixed). Thus, Equation 29 becomes:

$$\sum_{n=1}^{N} h(j-n)\sigma(n) = \quad (30)$$

$$\int_{-\infty}^{\infty} \left[ \sum_{n=1}^{N} h(j-n)g(z_n - z', \sigma_F) \right] \sigma_F(z')dz'.$$

Figure 11:
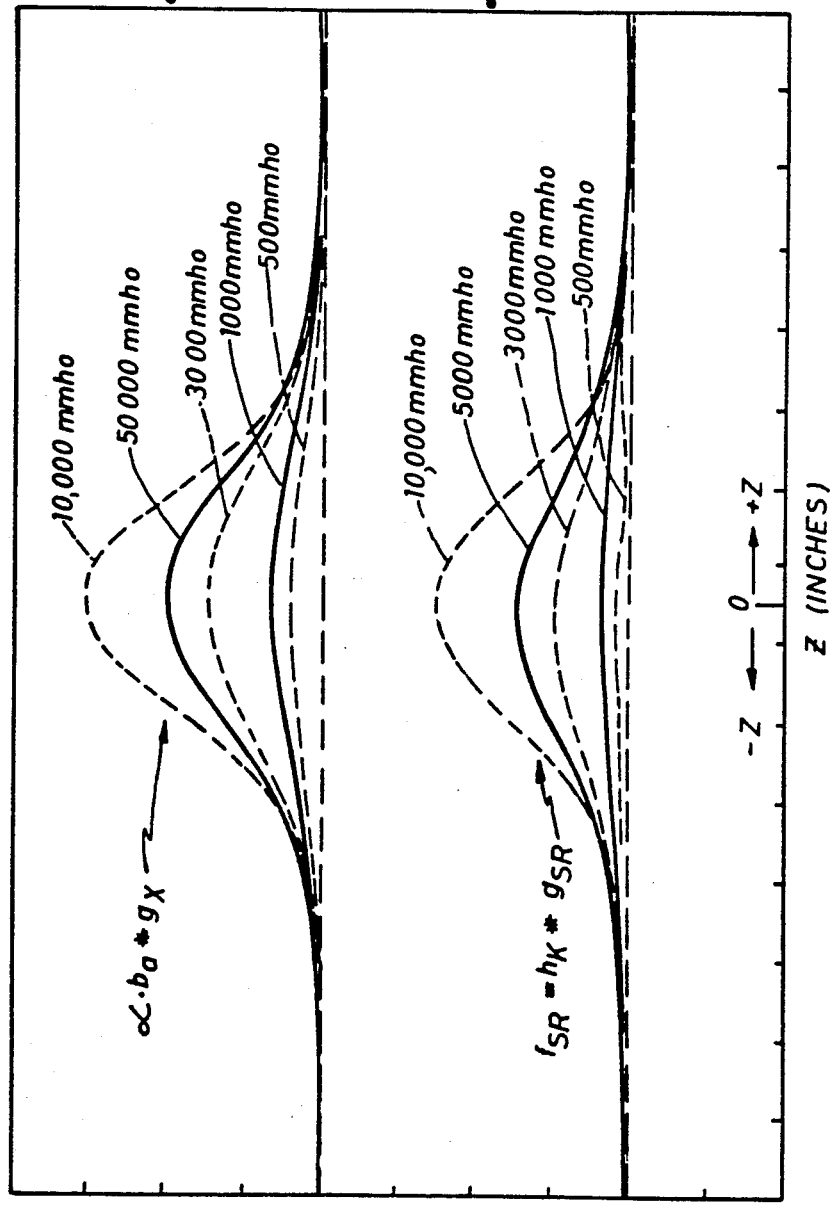
FIGS. 11(a) and (b) illustrate, respectively, curves for the matching filtered imaginary component of the sonde response function and the filtered skin effect filter function, both deconvolved according to the present invention and both curves plotted to the same abscissa.

If a sequence of samples, $\{g(n)\}$, is taken of an arbitrary response function $g(z)$, then the operation $$f(j) = \sum_{n=1}^{N} h(j-n)g(n) \quad (31)$$

describes the filtered response, and can be determined. FIG. 9 shows the result of such an operation on samples of the functions $g_R(z,\sigma_F)$ shown in FIG. 2. FIG. 11(b) is an illustration of the set of functions representing the deconvolution error response function $f_{SR}(z)$, which is derived from applying $h(z)$ to the functions $g_{SR}(z)$ shown in FIG. 10(a).

It has been disclosed by both the Moran patent and the Moran article that for a homogeneous medium the imaginary, or X-component signal, contains much of the information lost due to skin effect. The measured signals can be written as expansions in the parameter $L/\delta$, where $$\delta = \sqrt{\frac{2}{\omega\mu\sigma_F}} \quad (32)$$

is the skin depth. The expression for $\sigma_{SR}$ is $$\sigma_{SR} = \sigma_F\left( \frac{2}{3}\frac{L}{\delta} - \frac{2}{15}\frac{L^3}{\delta^3} + \ldots \right), \quad (33)$$

and for $\sigma_X$, $$\sigma_X = \sigma_F\left( \frac{2}{3}\frac{L}{\delta} - \frac{1}{2}\frac{L^2}{\delta^2} + \frac{2}{15}\frac{L^3}{\delta^3} - \ldots \right). \quad (34)$$

The corresponding sonde responser functions for the expressions in Equations 33 and 34, $g_{SR}(z)$ and $g_X(z)$, can be derived from Equation 4 for a homogeneous medium and is similar in form to Equations 33 and 34 with terms $L/\delta$. FIG. 10(b) shows the sonde response function $g_X(z)$ for the same sonde as shown in FIGS. 2 and 10(a). A comparison of FIGS. 10(a) and 10(b) shows a marked similarity between the curves.

Referring again to FIG. 2, the most obvious difference between $g_{GF}(z)$ and $g_R(z)$ is the relative loss of information far from the sonde. This far-field loss reappears in both $g_{SR}(z)$ and $f_{SR}(z)$ (FIGS. 10(a) and 11(b), respectively). This information also appears in $g_X(z)$, (FIG. 10(b)) although reduced relative to the central value. In accordance with this similarity between $g_X(z)$ and $g_{SR}(z)$, the present invention fits $g_X(z)$ computed at a given $\sigma_F$ in a homogeneous formation to the corresponding $f_{SR}(z)$. One technique for obtaining this desired transformation is to use a finite impulse response (FIR) filter. However, because the difference between $g_X(z)$ and $f_{SR}(z)$ is also a function of conductivity $\sigma_F$ (this is illustrated for the homogeneous medium by Equations 33 and 34), the fitting of $g_X(z)$ to $f_{SR}(z)$ at different conductivity levels requires a different fitting filter.

Although some of the details of these two filters are different, the main averaging lobes of the two will be quite similar since the major job of the filter transformation is to increase the contribution from parts of the formation at large distances from the sonde. The gains of the two filters are different, since the ratio of $\sigma_{SR}(z)$ to $\sigma_X(z)$ at, for example, 1000 millimhos is different from the ratio of 10,000 millimhos. If the ratio of $\sigma_{SR}(z)$ to $\sigma_X(z)$ is designated as $\alpha(\sigma_X(z))$, and the appropriate filter is normalized to unity gain, then the following identity is obtained:

$$\sum_{n=1}^{N} b(j-n)\sigma_X(n) = \alpha \sum_{n=1}^{N} b_1(j-n)\sigma_X(n), \quad (35)$$

where $b(n)$ is the fitting filter with gain and $b_1(n)$ is the same filter normalized to unity gain. This allows the desired transformation of $g_X(z)$ into $f_{SR}(z)$ to be done in two steps: a shape transformation followed by a magnitude transformation. The magnitude fitting simply makes sure that the area under the filtered $g_X(z)$ and $f_{SR}(z)$ curves are equal.

The fact that the normalized filters at two rather widely separated conductivity levels are similar suggests that the main fitting transformation is the central lobe of the filter. For the present invention, a normalized "average" of two filters, obtained at two widely separated conductivities, is determined. This average filter, $b_a(n)$, is applied to $g_X(z)$ at all conductivity levels. At each value of conductivity, the filtered $g_X(z)$ is compared to the corresponding $f_{SR}(z)$ at that same conductivity level. From these comparison, the values of a boosting function $\alpha(\sigma_X(z))$ needed to adjust the magnitude of the transformed $g_X(z)$ to be equal to $f_{SR}(z)$ are obtained. These values are then curve fitted to obtain the function which best fits the filtered $g_X(z)$ to $f_{SR}(z)$. For the preferred embodiment of the invention $\alpha(\sigma_X(z))$ is fitted to a power series expansion of $\sigma_X(z)$ having seven coefficients as given in Table 3. Table 2 illustrates a 199 term digital filter implementation of $b_a(n)$ according to the Remez exchange method mentioned above for the sonde response functions illustrated in FIG. 2. The coefficients of this implementation are also symmetrical about a center coefficient.

The expression contained in Equation 28 for the geometrical factor conductivity measurement at location j can be expressed as $$\sigma_{DGF}(j) = \sum_{n=1}^{N} h(j-n)\sigma_{GF}(n), \qquad (36)$$

where $\sigma_{DGF}(j)$ is free of skin effect. Using Equation 25, Equation 36 may be rewritten as:

$$\sigma_{DGF}(j) = \sum_{n=1}^{N} h(j-n)\sigma_R(n) + \sum_{n=1}^{N} h(j-n)\sigma_{SR}(n), \qquad (37)$$

wherein the term on the right is the deconvolution error term.

From the transformation of $g_X(z)$ into $f_{SR}(z)$ and the boosting function $\alpha(Y_X(j))$, the following approximation obtains:

$$\alpha(\sigma_X)\Sigma b_a(j-n)\sigma_X(n) \sim \sum_{n=1}^{N} h(j-n)\sigma_{SR}(n). \qquad (38)$$

The approximation of the skin effect error term by the transformed $\sigma_X$ measurement yields a corrected deconvolution measurement, $$\sigma_P(j) = \sum_{n=1}^{N} h(j-n)\sigma_R(n) + \alpha(\sigma_X)\sum_{n=1}^{N} b_a(j-n)\sigma_X(n), \qquad (39)$$

where $\sigma_P(j)$ is defined as a phasor deconvolution conductivity measurement.

Equation 39 may be rewritten in terms of deconvolution to obtain $$f_P(z) = h(z)*g_R(z) + \alpha(\sigma_X)[b_a(z)*g_X(z)], \qquad (40)$$

where $f_P(z)$ is the system response function for the logging system. A plot of the term $\alpha(\sigma_X(z))\cdot[b_a(z)*g_X(z)]$ for the logging sonde having the sonde response curves of FIG. 2 is shown in FIG. 11(a).

Turning now to FIG. 12, a block diagram illustration of an induction logging system which implements the phasor processing of the present invention, as given by Equation 39, is shown. An induction logging tool 30 is shown suspended in a borehole 26 by a wireline cable 28. The induction tool 30 includes a sonde 36 (for purposes of illustration, a simple two-coil sonde is shown) having a sonde response function $g(z,\sigma_F)$ which maps the formation conductivity $\sigma_F(z)$ into the log measurements. Tool 30 also includes a phase sensitive detector 32 which responds to signals from the transmitter oscillator 34 and the receive signal from receiver R to generate the in-phase, $\sigma_R(z,\sigma_F)$, and quadrature-phase, $\sigma_X(z,\sigma_F)$, components for each log measurement. One such tool which obtains very accurate measurements of quadrature phase components is disclosed in the U.S. patent application Ser. No. 271,367 which is incorporated herein. Although a logging tool which generates both an in-phase and a quadrature-phase component for each log measurement is shown in FIG. 12, certain aspects of the present invention are equally applicable to a tool which generates only an in-phase measurement. While FIG. 12 shows a tool with a single phase sensitive detector for generating the phase quadrature components of each conductivity measurement, a tool having two phase detectors could be used to generate the two phase components to be processed by the present invention.

Still referring to FIG. 12, a processing unit 12 for processing the induction measurements obtained by tool 30 is shown. A demux 16 separates the two components of each log measurement received from tool 30. The in-phase component is applied to deconvolution filter means 18 and provisionally to summation means 24. The quadrature-phase component is applied to linear filter means 20. Deconvolution filter means 18 implements a filter response function $h(z)$ based on the geometrical factor response function $g_{GF}(z)$. The derivation of the filter function $h(z)$ is presented above, and for the preferred embodiment of the invention, $h_K(z)$ represents a filter frunction which, when convolved with $g(z)$ of a typical focused coil sonde, produces a system response function having a sharpened central lobe and decreased sidelobes.

The output of filter 18 is a deconvolved conductivity measurement $\sigma_D(j)$ and represents a processed measurement in which shoulder effect has been reduced. The output from filter 18 is applied to summation means 24, and to recorder 14 for possible recording as a processed log. Provisionally applied to summation means 24 is the in-phase component measurements from demux 16. When used in conjunction with the phasor processing of the quadrature-phase component $\sigma_P(j)$, an improved induction log may be obtained either by summing $\sigma_P(j)$ with $\sigma_D(j)$ or with $\sigma_R(z,\sigma_F)$ directly, where the phasor processing of the present invention reduces skin effect in the processed measurements.

Processing unit 12 also processes the log measurements to reduce skin effect by filtering the quadrature-phase measurements in a non-linear filter means comprised of a linear filter means 20 and an amplifying means 22. Filter means 20 implements the linear filter response function $b_a(z)$ as given above. The output from filter means 20 is boosted by amplifier means 22 according to a predetermined non-linear boosting function $\alpha(\sigma_X(z,\sigma_F))$, which varies as a function of the measured quadrature-phase component $\sigma_X$. The processed measurements on line 23 from amplifier 22 represent skin effect error correction factors which, when summed in summation means 24 with either the deconvolved conductivity measurements $\sigma_D(j)$ or the $\sigma_R(z,\sigma_F)$ measurements directly from tool 30, results in a phasor processed conductivity measurement $\sigma_P(j)$ with reduced skin effect. The output from summation means 24 is applied, along with $\sigma_D(j)$, to recorder 14 for recording as an induction log trace. For the preferred embodiment, processing unit 12 is a general purpose programmed computer.

Figure 13:
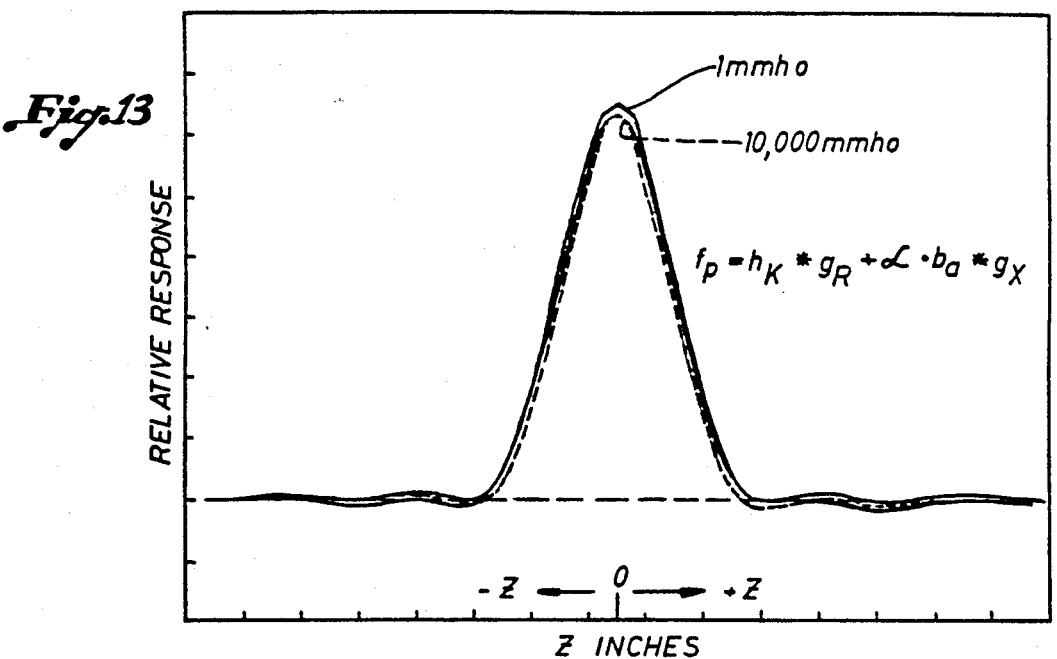
FIG. 13 is a plot of the resulting system response function resulting from the phasor processing as shown in FIG. 12.

Referring now to FIG. 13, a plot of the constant system response function $f_P(z)$ obtained according to the present invention for the sonde response curves shown in FIG. 2 at several conductivities is shown. The system response represented by $f_P(z)$ is virtually constant over the range from 1 mmho to 10,000 mmhos, and possesses the desired characteristics of a sharpened and increased central main lobe with side lobes that have been reduced to near zero.

Figure 14:
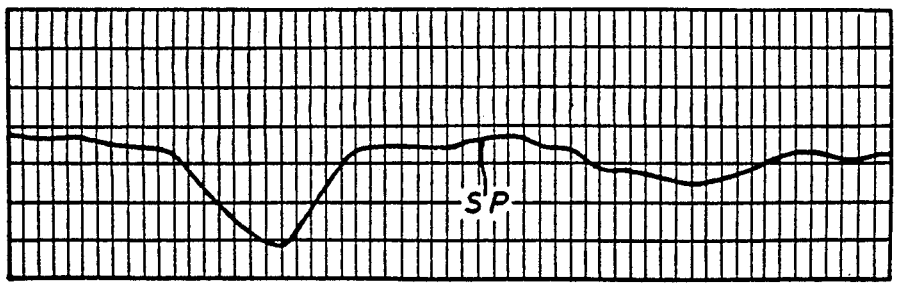
FIG. 14 is a field log showing the improvement in the accuracy of calculated resistivity according to the present invention.

Turning now to FIG. 14, a short section from an actual field induction log illustrating the improved accuracy of the phasor processing of the present invention is shown. The log shown in FIG. 14 was obtained using the induction tool whose transfer functions are shown in FIG. 2. Five traces are illustrated in FIG. 14, the SP (spontaneous potential), the SFL electrode tool trace, the $IL_M$ (a medium depth induction tool), $IL_d$ (a normal depth induction tool) and the $IL_d$ measured data processed according to the present invention (phasor processed trace). The benefits of the present invention are dramatically illustrated in the section identified as region A. In this region, the prior-art methods of processing the log measurements identified by the curve $IL_d$ is indicating a low resistivity value while the phasor processed $IL_d$ data is essentially overlaying the SFL curve. In the A region, the SP curve is essentially showing no change. This absence of change in the SP curve indicates that there is very little invasion of the bed at region A. Thus, the indication of the SFL electrode tool, which does not suffer from shoulder effect, is accurately representing the true resistivity (or its inverse, conductivity) of the formation.

The benefit of the deconvolution and skin effect phasor correction of the present invention is also illustrated in region A because of the large contrast between the high resistivity values occurring in the region A and the high conductivity shoulder beds located to either side. Because the main lobe of the sonde response function spans not only region A but also the shoulder beds to either side (this is even true in the case of the compensated system response function of the present invention), the high conductivities of the shoulder beds, which are experiencing significant skin effect, are making a significant contribution to the conductivity reading obtained in the region A. But even in the presence of skin effect from the high conductivity shoulder beds, the phasor processing of the present invention more accurately determines the conductivity of the low conductivity bed located at region A.

Figure 15:
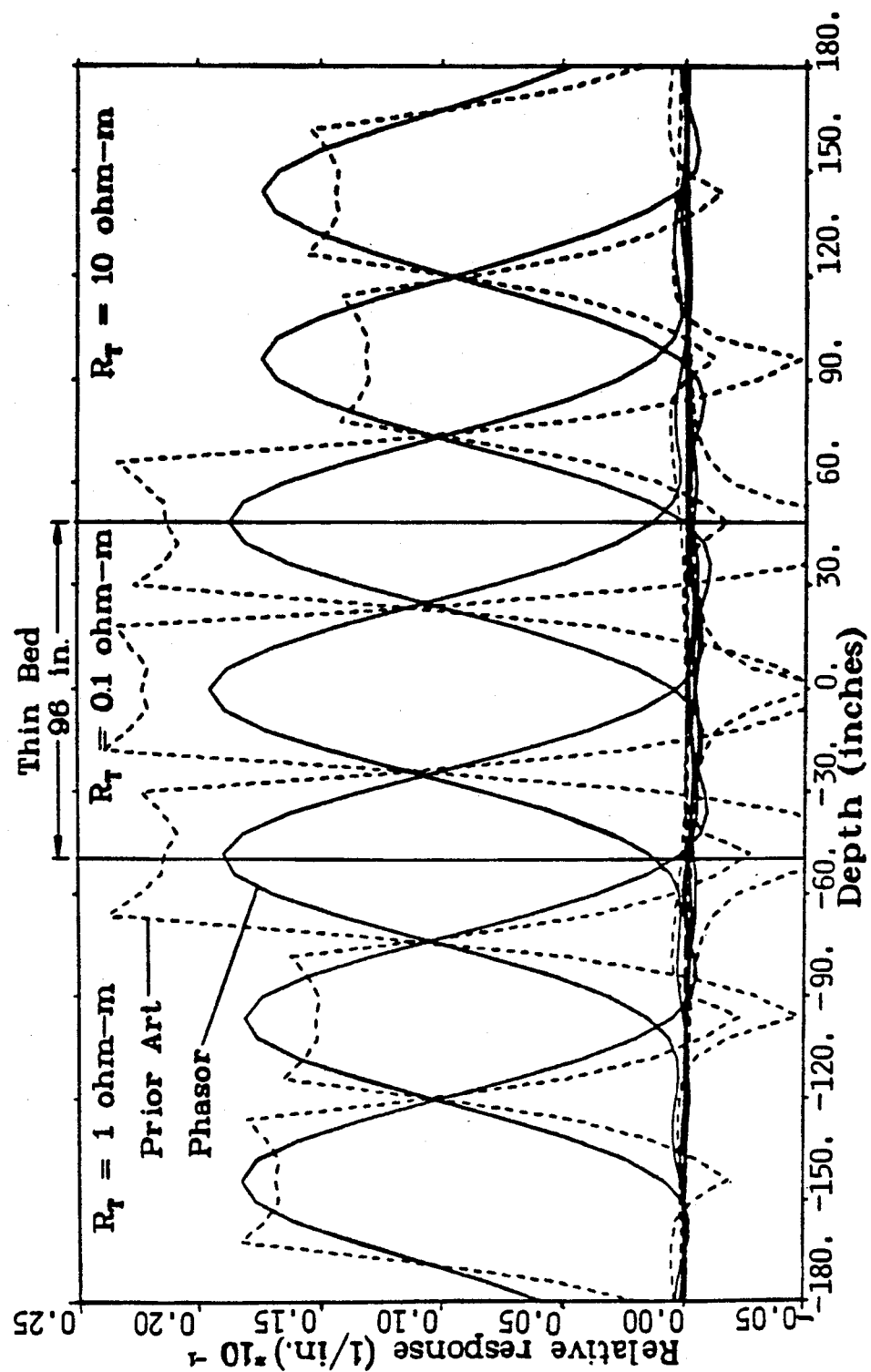
FIG. 15 is a curve representing the response of a standard induction sonde operating in a layered formation, with each response curve displayed as a "snapshot" of the response at a given location.

Referring now to FIG. 15, a plot of $f_P(z)$ of a standard focused coil sonde, such as that represented by the sonde response functions of FIG. 2, in a layered formation is shown. Each curve illustrated in FIG. 15 is displayed as a "snapshot" of the response at the location the curve is illustrated. The dotted curves represent the sonde responses as processed by a typical prior-art technique, i.e., a fixed deconvolution followed by boosting to the correct geometrical factor theory value. The solid curves represent the constant system response obtained according to the phasor deconvolution processing of the present invention. The improved results of the present invention are clearly evident in FIG. 15 from the nearly constant system response function as the tool passes through a thin layered bed, as compared to the varying responses of prior-art systems.

Summarizing the present invention, a method and system for processing an induction log to reduce the unwanted contributions from currents flowing in formations spaced apart from the measurement depth (shoulder effect) and the effects of the non-linear variations in the sonde response function with linear variations in formation conductivity (skin effect) is disclosed. To compensate for the shoulder effect, the sonde response function obtained at zero conductivity (the geometrical factor) is Fourier transformed into the frequency domain. A window function is applied to the transformed zero conductivity sonde response function to pass only those spatial frequencies of the transformed function up to a predetermined upper frequency. This upper spatial frequency is chosen to be less than the first frequency at which the transformed zero conductivity sonde response function first goes to zero.

A target function is chosen so as to produce any desired response function of the logging tool, such as a system response function having reduced side lobes to reduce shoulder effect. The ratio of the target transfer function to the transformed and truncated sonde response function is formed and its inverse Fourier transform taken to obtain a spatial filter function that produces minimum ripple in the processed log. A Kaiser window function is disclosed as a preferred target transfer function to obtain the desired reduction in the shoulder effect. The reduction in the unwanted contributions from the currents flowing in formations spaced apart from the measurement depth occurs when the spatial filter function obtained from the deconvolution method is convolved with the in-phase component measurements of the log measurements.

To minimize skin effect, the present invention discloses a method and system of phasor processing of the induction log measurements in which quadrature-phase components $\sigma_X(z)$ are filtered by a filtering function that produces skin effect error correction components. These components are added to the deconvolved in-phase component measurements $\sigma_R(z)$ (shoulder effect corrected) to produce a processed log that includes both shoulder effect and skin effect corrections. The skin effect correction may be made independently of the shoulder effect correction to obtain an improved log. Skin effect error correction components may be added to the in-phase components uncorrected for shoulder effect. Additionally, the deconvolution method disclosed for the shoulder effect correction when used in conjunction with the phasor processing may be used to achieve any desired tool system response function when based on the geometrical factor sonde response function. Also, the prior-art techniques of shoulder effect correction and log processing, such as that disclosed in U.S. Pat. No. 3,166,709, could be used to process the in-phase component measurements prior to summation with the skin effect correction components.

TABLE 1

| Digital Filter Coefficients For $h_K(z)$ ||
| Coefficient No. | Coefficient Value |
| --- | --- |
| $h_{-99}, h_{99}$ | 0.3650470E−02 |
| $h_{-98}, h_{98}$ | −0.2694050E−02 |
| $h_{-97}, h_{97}$ | −0.2811380E−02 |
| $h_{-96}, h_{96}$ | −0.2872980E−02 |
| . | −0.2388200E−02 |
| . | −0.1197770E−02 |
| . | 0.4624940E−03 |
| . | 0.2048940E−02 |
| . | 0.2921270E−02 |
| . | 0.2630260E−02 |
| . | 0.1150230E−02 |
| . | −0.1039890E−02 |
| . | −0.3090760E−02 |
| . | −0.4096590E−02 |
| . | −0.3478090E−02 |
| . | −0.1279590E−02 |
| . | 0.1777950E−02 |
| . | 0.4502780E−02 |
| . | 0.5706120E−02 |
| . | 0.4686340E−02 |
| . | 0.1595170E−02 |
| . | −0.2509830E−02 |
| . | −0.6039590E−02 |
| . | −0.7446670E−02 |

TABLE 1-continued
Digital Filter Coefficients For $h_K(z)$

| Coefficient No. | Coefficient Value |
|---|---|
| | −0.5906790E−02 |
| | −0.1736930E−02 |
| | 0.3605380E−02 |
| | 0.8008400E−02 |
| | 0.9524720E−02 |
| | 0.7206670E−02 |
| | 0.1614110E−02 |
| | −0.5265010E−02 |
| | −0.1069880E−01 |
| | −0.1228890E−01 |
| | −0.9010330E−02 |
| | −0.1739970E−02 |
| | 0.6738700E−02 |
| | 0.1328040E−01 |
| | 0.1477300E−01 |
| | 0.1017950E−01 |
| | 0.8172550E−03 |
| | −0.9878100E−02 |
| | −0.1764270E−01 |
| | −0.1903780E−01 |
| | −0.1294930E−01 |
| | −0.1257590E−02 |
| | 0.1168230E−01 |
| | 0.2062430E−01 |
| | 0.2151880E−01 |
| | 0.1328200E−01 |
| | −0.1510260E−02 |
| | 0.1737060E−01 |
| | −0.2792580E−01 |
| | −0.2844720E−01 |
| | −0.1795130E−01 |
| | 0.1058570E−03 |
| | 0.1888980E−01 |
| | 0.3067360E−01 |
| | 0.3000050E−01 |
| | 0.1604740E−01 |
| | −0.6634690E−02 |
| | −0.2956370E−01 |
| | −0.4348060E−01 |
| | −0.4207400E−01 |
| | −0.2480480E−01 |
| | 0.2406630E−02 |
| | 0.2906870E−01 |
| | 0.4403210E−01 |
| | 0.3998240E−01 |
| | 0.1674600E−01 |
| | −0.1804130E−01 |
| | −0.5143000E−01 |
| | −0.6988990E−01 |
| | −0.6502080E−01 |
| | −0.3717600E−01 |
| | 0.3726000E−02 |
| | 0.4140470E−01 |
| | 0.5927990E−01 |
| | 0.4718070E−01 |
| | 0.6113520E−02 |
| | −0.5105890E−01 |
| | −0.1036620E+00 |
| | −0.1308410E+00 |
| | −0.1200720E+00 |
| | −0.7324410E−01 |
| | −0.7599670E−02 |
| | 0.4942850E−02 |
| | 0.7019950E−01 |
| | 0.3841720E−01 |
| | −0.4200150E−01 |
| | −0.1443480E+00 |
| | −0.2246340E+00 |
| | −0.2341880E+00 |
| | −0.1355420E+00 |
| | 0.8311230E−01 |
| | 0.4003430E−00 |
| | 0.7635210E+00 |
| | 0.1100710E+01 |
| | 0.1339210E+01 |
| $h_o$ | 0.1425300E+01 |

TABLE 2
Digital Filter Coefficients For $b_a(z)$

| Coefficient No. | Coefficient Value |
|---|---|
| $b_{-99}, b_{99}$ | 0.2185320E−05 |
| $b_{-98}, b_{98}$ | −0.1585630E−05 |
| $b_{-97}, b_{97}$ | −0.1526300E−05 |
| | −0.1457160E−05 |
| | −0.1156660E−05 |
| | −0.5703150E−06 |
| | 0.1720460E−06 |
| | 0.8173820E−06 |
| | 0.1100510E−05 |
| | 0.8737250E−06 |
| | 0.1942970E−06 |
| | −0.6741490E−06 |
| | −0.1354680E−05 |
| | −0.1512740E−05 |
| | −0.1013080E−05 |
| | −0.3641510E−08 |
| | 0.1122170E−05 |
| | 0.1868650E−05 |
| | 0.1020230E−05 |
| | −0.3798470E−06 |
| | −0.1761920E−05 |
| | −0.2507440E−05 |
| | −0.2207930E−05 |
| | −0.8824890E−06 |
| | 0.9867420E−06 |
| | 0.2619290E−05 |
| | −0.3253250E−05 |
| | 0.2492180E−05 |
| | 0.5253640E−06 |
| | −0.1892510E−06 |
| | −0.3719280E−05 |
| | −0.4064330E−05 |
| | −0.2611550E−05 |
| | 0.1755860E−06 |
| | 0.3196300E−05 |
| | 0.5038820E−05 |
| | 0.4896980E−05 |
| | 0.2480740E−05 |
| | −0.1327550E−05 |
| | −0.4944950E−05 |
| | −0.6716890E−05 |
| | −0.5636800E−05 |
| | −0.1877340E−05 |
| | 0.3155710E−05 |
| | 0.7318370E−05 |
| | 0.8615860E−05 |
| | 0.6127380E−05 |
| | 0.5509820E−06 |
| | −0.5924170E−05 |
| | −0.1043770E−04 |
| | −0.1068260E−04 |
| | −0.6033030E−05 |
| | 0.1968950E−05 |
| | 0.1003450E−04 |
| | 0.1443580E−04 |
| | 0.1267370E−04 |
| | 0.4759300E−05 |
| | −0.6412260E−05 |
| | −0.1604370E−04 |
| | −0.1939480E−04 |
| | −0.1401000E−04 |
| | −0.1202220E−05 |
| | 0.1400780E−04 |
| | 0.2469890E−04 |
| | 0.2503690E−04 |
| | 0.1323360E−04 |
| | −0.6920500E−05 |
| | −0.2692550E−04 |
| | −0.3685450E−04 |
| | −0.2994610E−04 |
| | −0.6569830E−05 |
| | 0.2456340E−04 |
| | 0.4887850E−04 |
| | 0.5221100E−04 |
| | 0.2809260E−04 |
| | −0.1686590E−04 |
| | −0.6290760E−04 |
| | −0.8402550E−04 |
| | −0.6048550E−04 |

TABLE 2-continued

| Digital Filter Coefficients For $b_0(z)$ | |
|---|---|
| Coefficient No. | Coefficient Value |
| . | 0.7529580E−05 |
| . | 0.9198510E−04 |
| . | 0.1417030E−03 |
| . | 0.1039360E−03 |
| . | −0.3823260E−04 |
| . | −0.2202710E−03 |
| . | −0.2557130E−03 |
| . | 0.1830470E−03 |
| . | 0.1548460E−02 |
| . | 0.4358730E−02 |
| . | 0.9099500E−02 |
| . | 0.1610210E−01 |
| . | 0.2542360E−01 |
| . | 0.3675980E−01 |
| . | 0.4941700E−01 |
| . | 0.6236010E−01 |
| . | 0.7433590E−01 |
| . | 0.8405480E−01 |
| . | 0.9039680E−01 |
| $b_0$ | 0.9260070E−01 |

TABLE 3

Coefficients of Power Series Expansion For $\alpha(\sigma_X(z)) = a_0 + a_1 \sigma_X + a_2 \sigma_X^2 + a_3 \sigma_X^3 + a_4 \sigma_X^4 + a_5 \sigma_X^5 + a_6 \sigma_X^6$

| Coefficient No. | Coefficient Value |
|---|---|
| $a_0$ | 0.10423856E+01 |
| $a_1$ | 0.20005844E+01 |
| $a_2$ | −0.37821898E+01 |
| $a_3$ | 0.38435026E+01 |
| $a_4$ | −0.19385290E+01 |
| $a_5$ | 0.47251915E+00 |
| $a_6$ | −0.44378013E−01 |

I claim:

1. A method of processing induction measurements of sub-surface formations taken by an induction logging system at various depths in a borehole in the earth, the logging system having a spatial domain sonde response function with real and imaginary components which vary with the conductivity of the sub-surface formations being investigated, said method reducing both the unwanted contributions in each measurement from formation currents flowing in formations spaced apart from each measurement depth and the effects of variations in the sonde response function with formation conductivity, each log measurement consists of an in-phase and a quadrature-phase component where the real component of the sonde response function transforms the formation conductivity distribution into the in-phase components and the imaginary component of the sonde response function transforms the formation conductivity distribution into the quadrature-phase components, said method comprising the steps of:
 (a) deconvolving the in-phase log measurements based on the real component of the sonde response function obtained at zero conductivity to obtain shoulder effect corrected log measurements;
 (b) filtering the quadrature-phase component measurements according to a predetermined non-linear spatial filtering function to obtain correction component measurements representative of the change in the sonde response function as a function of formation conductivity; and
 (c) summing the processed in-phase and correction component measurements to obtain the processed log measurements in which the unwanted contributions in each in-phase measurement to formation currents flowing in distant formations about each measurement point and the effects of variations in the sonde response function to variations in the conductivity of the formation being measured are reduced.

2. The method of claim 1 wherein the step of filtering the quadrature-phase component measurements according to a predetermined non-linear spatial filtering function comprises the steps of:
 (a) convolving the quadrature-phase component measurements with a predetermined linear filtering function; and
 (b) boosting the amplitude of each filtered quadrature-phase component measurement according to a boosting function, the linear filter transfer function of step (a) cooperating with the magnitude boosting function to obtain the predetermined non-linear spatial filtering function, the filtered and boosted quadrature-phase component measurements forming correction component measurements representative of the variations in the real component of the sonde response function with variations in formation conductivity.

3. The method of claim 1 wherein the step of deconvolving the in-phase log measurements to obtain each shoulder effect corrected log measurement comprises the steps of:
 (a) applying a predetermined weighting coefficient to each of a plurality of adjacent spaced apart in-phase log measurements; and
 (b) summing together the plurality of weighted in-phase log measurements to obtain a shoulder effect corrected in-phase log measurement.

4. The method of claims 1 or 2 wherein the step of filtering the quadrature-phase component measurements includes the steps of:
 (a) determining the difference between the sonde response function obtained at zero conductivity and the sonde response function at various formation conductivities, the difference functions thus obtained comprising skin effect error functions;
 (b) deconvolving each skin effect error function with a first filter function; and
 (c) determining a second filter function which when applied to the imaginary component of the sonde response function generates a function approximately equal to the deconvolved skin effect error functions at each value of conductivity, the second filter function comprising the predetermined non-linear spatial filtering function.

5. A method of processing induction measurements of sub-surface formations taken by an induction logging system at various depths in a borehole drilled into the earth, the logging system having a spatial domain sonde response function with real and imaginary components which vary with the conductivity of the sub-surface formations being investigated, said method reducing the effects of variations in the sonde response function with formation conductivity, each log measurement consisting of an in-phase and a quadrature-phase component where the real component of the sonde response function transforms the formation conductivity distribution into the in-phase components and the imaginary component of the sonde response function transforms the formation conductivity distribution into the quadrature-phase components, said method comprising the steps of:
 (a) filtering the quadrature-phase component measurements according to a predetermined non-linear spatial filtering function to obtain correction component measurements representative of the change in the sonde response function as a function of formation conductivity; and (b) summing the in-phase and correction component measurements to obtain the processed log measurements in which the variations in the sonde response function to variations in the conductivity of the formations being measured are reduced.

6. The method of claim 5 wherein the step of filtering the quadrature-phase component measurements includes the step of boosting the amplitude of each filtered quadrature-phase component measurement according to a boosting function, the filtered and boosted quadrature-phase component measurements forming correction component measurements representative of the variations in the real component of the sonde response function with variations in formation conductivity.

7. The method of claims 5 or 6 wherein the step of filtering the quadrature-phase component measurements includes the steps of:

(a) determining the difference between the sonde response function obtained at zero conductivity and the sonde response function at various formation conductivities, the difference functions thus obtained comprising skin effect error functions;

(b) deconvolving each skin effect error function with a first filter function; and (c) determining a second filter function which when applied to the imaginary component of the sonde response function generates a function approximately equal to the deconvolved skin effect error functions at each value of conductivity, the second filter function comprising the predetermined non-linear spatial filtering function.

8. A method of processing induction measurements of subsurface formations taken by an induction logging system at various depths in a borehole in the earth, the logging system having a spatial domain sonde response function which varies with the conductivity of the subsurface formations being investigated, said method reducing unwanted contributions in each measurement from formation currents flowing in formations spaced apart from the measurement and the effects of variations in the sonde response system transfer function with formation conductivity, each log measurement consisting of an in-phase and a quadrature-phase component where the real component of the sonde response function transforms the formation conductivity distribution into the in-phase components and the imaginary component of the sonde response function transforms the formation conductivity distribution into the quadrature-phase components, said method comprising the steps of:

(a) deconvolving the in-phase component measurements based on the sonde response function at zero conductivity without regard for variations in the sonde response function with conductivity thereby reducing in each in-phase component measurement the unwanted contributions from formations spatially displaced from each measurement point;

(b) filtering the quadrature-phase component log measurements according to a predetermined non-linear spatial filtering function to obtain correction component measurements representative of the change in the sonde response function as a function of formation conductivity; and (c) summing the processed in-phase and correction component measurements obtained from steps (a) and (b), respectively, to obtain the processed log measurements in which the unwanted contributions in each log measurement to formation currents flowing in distant formations about each measurement depth and the effects of variations in the sonde response function to variations in the conductivity of the formation being investigated are reduced.

9. A method of processing induction measurements $\sigma_M(z,\sigma_F)$ of sub-surface formations taken by an induction logging system at various depths z in a borehole in the earth, the logging system having a spatial domain sonde response function $g(z,\sigma_F)$ at each value of conductivity $\sigma_F(z)$ given by the expression, $g(z,\sigma_F) = g_R(z,\sigma_F) + ig_X(z,\sigma_F)$, where $g(z,\sigma_F)$ varies with $\sigma_F(z)$ of the subsurface formation being investigated and where $g(z,\sigma_F)$ is further characterized by a main lobe and non-zero sidelobes, said method reducing the effects of variations in $g(z,\sigma_F)$ with variations in $\sigma_F(z)$, each log measurement $\sigma_M(z,\sigma_F)$ having an in-phase $\sigma_R(z,\sigma_F)$ and a quadrature-phase $\sigma_X(z,\sigma_F)$ component $(\sigma_M(z,\sigma_F) = \sigma_R(z,\sigma_F) + i\sigma_X(z,\sigma_F))$, where $g_R(z,\sigma_F)$ transforms $\sigma_F(z)$ into $\sigma_R(z,\sigma_F)$ and $g_X(z,\sigma_F)$ transforms $\sigma_F(z)$ into $\sigma_X(z,\sigma_F)$, said method comprising the steps of:

(a) obtaining $g(z,\sigma_F)$ at $\sigma_F(z) = 0 (g_{GF}(z))$;

(b) convolving $\sigma_X(z,\sigma_F)$ with the filter function $b_a(z)$ which best satisfies, for different values of conductivity, the expression $$b_a(z) * g_X(z,\sigma_F) = h(z) * g_s(z,\sigma_F)$$

where, $$g_s(z,\sigma_F) = g_{GF}(z) - g_R(z,\sigma_F),$$

and h(z) is any filter function based on $g_{GF}(z)$, and boosting the amplitude of the results of the convolution of $b_a(z)$ with $g_X(z,\sigma_F)$ according to a predetermined boosting function $\alpha(\sigma_X(z,\sigma_F))$ so that $\alpha(\sigma_X(z,\sigma_F))$, is more nearly equal to $h(z) * g_s(z,\sigma_F)$ at each value of $\sigma_F(z)$; and (c) summing together $\sigma_R(z,\sigma_F)$ and the processed $\sigma_X(z,\sigma_F)$ measurements of step (b) to obtain the processed log measurements in which variation in $g(z,\sigma_F)$ with $\sigma_F(z)$ are reduced.

10. An induction logging system for generating an induction log from conductivity measurements of subsurface formations taken by an induction logging tool at various depths in a borehole in the earth, the logging tool having a sonde which has a spatial domain sonde response function with real and imaginary components which vary with the conductivity of the sub-surface formations being investigated, said system reducing the effects of variations in the sonde response function with formation conductivity (skin effect), the system comprising:

(a) a means for positioning the logging tool at various depths in the borehole, said positioning means including a wireline cable for transmitting signals to and from the tool, the tool including a means for generating an in-phase and a quadrature-phase component for each conductivity measurement where the real component of the sonde response function transforms the formation conductivity distribution into the in-phase components and the imaginary component of the sonde response function transforms the formation conductivity distribution into the quadrature-phase components;

(b) a processing unit responsive to the conductivity measurements for processing the measurements to reduce skin effect, said processing unit including, (1) a non-linear filtering means responsive to the quadrature-phase component measurements for generating skin effect correction component measurements, the filter response function for said non-linear filtering means derived from difference functions obtained from the differences between the sonde response function obtained at zero formation conductivity and the real component of the sonde response function obtained at different formation conductivities, and (2) a summation means responsive to the in-phase component measurements and said non-linear filtering means for generating phasor processed log measurements by summing the deconvolved in-phase conductivity measurements with the skin effect correction component measurements, the phasor processed measurements having reduced skin effect; and (c) a recorder responsive to said processing unit and said positioning means for recording the phasor processed measurements as the output log of the system.

11. The logging system of claim 10 wherein said non-linear filtering means comprises:

(a) a linear filtering means for filtering the quadrature-phase component measurements according to a filter response function obtained from an average of the difference functions; and (b) an amplifying means whose gain function varies non-linearly with the magnitude of a measured formation conductivity variable, said amplifying means boosting the filtered components from said linear filtering means to obtain the skin effect error correction components, the gain function derived from the imaginary component of the sonde response function and from the difference functions.

12. The logging system of claim 11 wherein said processing unit is a general purpose digital computer.

13. The logging system of claim 10 wherein said means for generating the in-phase and quadrature-phase component measurements includes a single phase sensitive detector for sequentially generating the component measurements at each measurement depth.

14. The logging system of claim 10 wherein said means for generating the in-phase and quadrature-phase component measurements includes a phase sensitive detector for each component measurement.

* * * * *